United States Patent
Bonsen et al.

(10) Patent No.: US 11,933,207 B2
(45) Date of Patent: Mar. 19, 2024

(54) PULSE TURBO CHARGING EXHAUST SYSTEM

(71) Applicant: PACCAR Inc, Bellevue, WA (US)

(72) Inventors: Greg Bonsen, Bellingham, WA (US); Paul Hancock, Bellingham, WA (US); Huateng Yang, Canton, MI (US); Chang-Wook Lee, Bellingham, WA (US); Olivier Lebastard, Anacortes, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 17/808,441

(22) Filed: Jun. 23, 2022

(65) Prior Publication Data

US 2023/0417168 A1   Dec. 28, 2023

(51) Int. Cl.
*F01N 13/10* (2010.01)
*F02B 37/00* (2006.01)
*F02B 75/18* (2006.01)

(52) U.S. Cl.
CPC ............ *F01N 13/10* (2013.01); *F02B 37/001* (2013.01); *F02B 2075/1824* (2013.01)

(58) Field of Classification Search
CPC ...... F01N 13/10; F01N 13/107; F02B 37/001; F02B 37/007; F02B 2075/1824
See application file for complete search history.

(56) References Cited

U.S. PATENT DOCUMENTS

| | | | |
|---|---|---|---|
| 2,230,666 A | 2/1941 | Martin et al. | |
| 5,692,375 A | 12/1997 | Novak et al. | |
| 7,252,177 B2 * | 8/2007 | Minato | F01N 13/10 |
| | | | 181/240 |
| 8,650,867 B2 | 2/2014 | Sloss | |
| 10,626,780 B2 | 4/2020 | Konstanzer et al. | |
| 11,473,481 B2 * | 10/2022 | Wolk | F01N 13/10 |
| 2009/0158724 A1 * | 6/2009 | Muller | F01N 13/143 |
| | | | 60/624 |

(Continued)

FOREIGN PATENT DOCUMENTS

| | | | |
|---|---|---|---|
| CN | 103252660 A | * 8/2013 | |
| CN | 104234809 A | * 12/2014 | ........... F01N 13/102 |

(Continued)

OTHER PUBLICATIONS

European Search Report and Written Opinion for EP Application No. 23155700.0 dated Oct. 30, 2023 (8 pages).

*Primary Examiner* — Ngoc T Nguyen

(57) ABSTRACT

Exhaust systems are described. In examples, an exhaust flow path couples exhaust ports with one or more turbochargers of an engine. The exhaust flow path may have a portion flowing through a cylinder head (e.g., couplable to the exhaust ports) and a portion flowing through an exhaust manifold (couplable to the cylinder head and the turbocharger(s)). The flow paths may be shaped to reduce the sharpness of turns between the exhaust ports and the turbocharger(s). For example, curves along the flow path may be less than 90 degrees or have a minimum curve radius, which may vary along the flow path. Additionally, at least two, independent flow paths may exist between the exhaust ports and the turbocharger(s). The cross-sectional shape of any part of the flow path may be elliptical, including at inlets and outlets.

20 Claims, 20 Drawing Sheets

(56) References Cited

U.S. PATENT DOCUMENTS

| | | | | |
|---|---|---|---|---|
| 2013/0199466 A1* | 8/2013 | Friedfeldt | ............... | F02B 75/20 |
| | | | | 123/90.1 |
| 2014/0298799 A1 | 10/2014 | Wu et al. | | |
| 2014/0366525 A1* | 12/2014 | Wagner | ................... | F02B 67/10 |
| | | | | 60/323 |

FOREIGN PATENT DOCUMENTS

| | | | | | |
|---|---|---|---|---|---|
| CN | 106481425 | A | * | 3/2017 | ............ F01N 13/08 |
| CN | 209855894 | U | * | 12/2019 | |
| CN | 113 339 122 | A | | 9/2021 | |
| CN | 113339122 | A | * | 9/2021 | |
| CN | 114 135 380 | A | | 3/2022 | |
| CN | 114135380 | A | * | 3/2022 | |
| DE | 842873 | C | | 7/1952 | |
| DE | 70 16 551 | U | | 4/1973 | |
| DE | 19957979 | A1 | | 6/2001 | |
| DE | 102013210665 | A1 | * | 12/2014 | ............. F01D 9/026 |
| DE | 102014216814 | A1 | * | 3/2015 | ........... F01N 13/107 |
| DE | 10 2014 208703 | A1 | | 11/2015 | |
| EP | 0666411 | A1 | | 8/1995 | |
| FR | 2506837 | A1 | | 12/1982 | |
| FR | 2895443 | A1 | * | 6/2007 | |
| GB | 2399142 | A | * | 9/2004 | |
| GB | 2582599 | A | * | 9/2020 | .............. F01N 3/08 |
| JP | 04203317 | A | * | 11/1990 | |
| JP | H110266844 | A | | 10/1998 | |
| JP | 2012215100 | A | * | 11/2012 | |
| KR | 100836203 | B1 | * | 9/2001 | |
| KR | 100289303 | B1 | * | 6/2008 | |
| WO | 2013/058700 | A1 | | 4/2013 | |
| WO | WO-2013161596 | A1 | * | 10/2013 | |
| WO | WO-2014032783 | A1 | * | 3/2014 | ........... F01N 13/107 |
| WO | WO-2016056101 | A1 | * | 4/2016 | |

\* cited by examiner

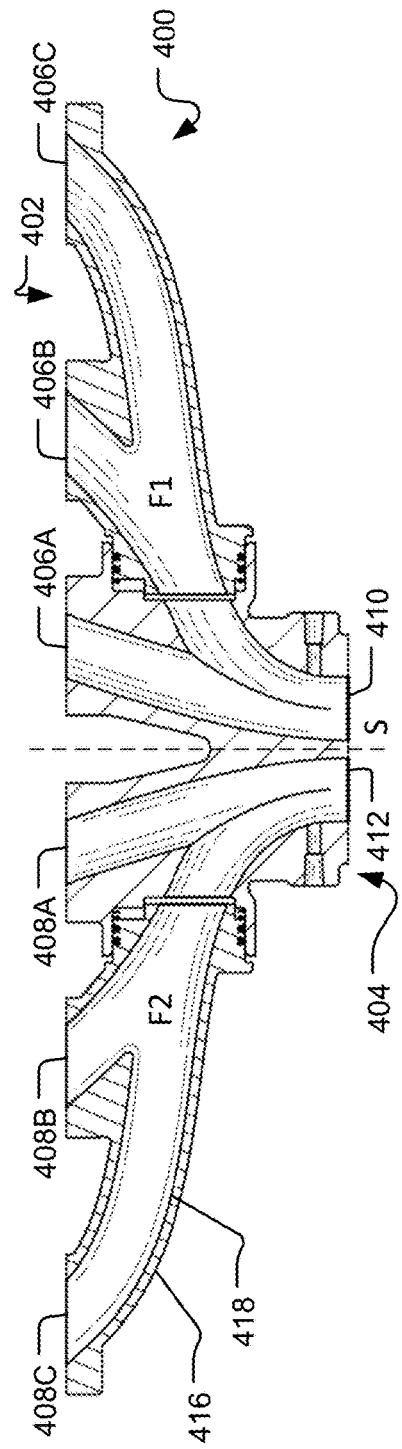
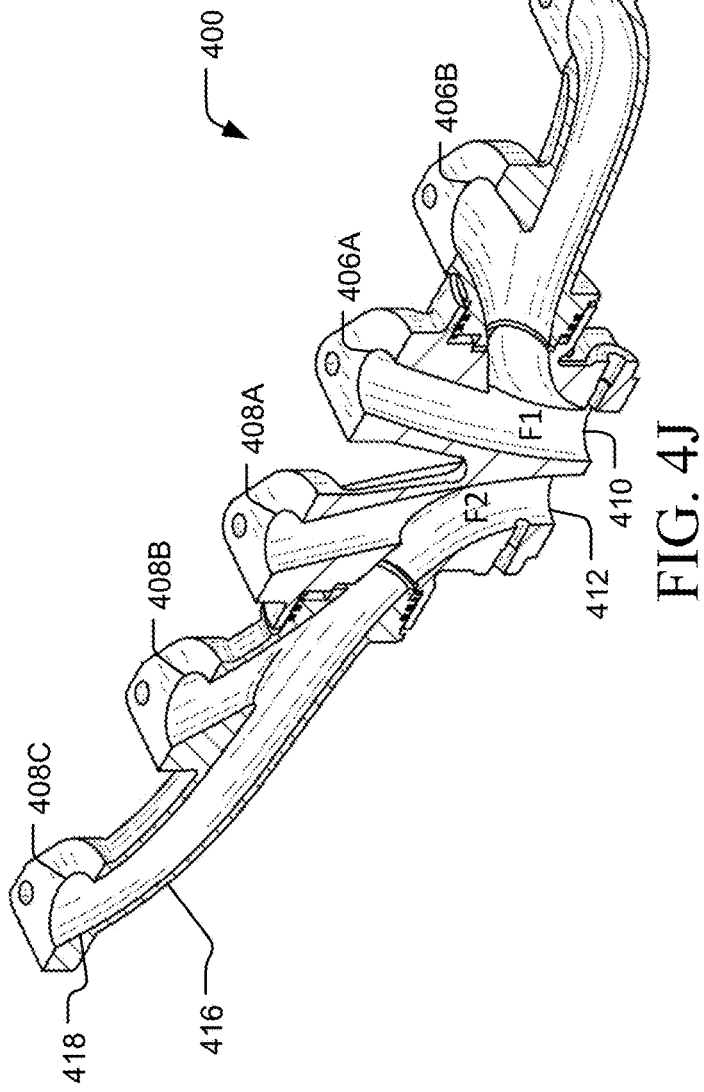
FIG. 4I
FIG. 4J

PULSE TURBO CHARGING EXHAUST SYSTEM

BACKGROUND

Vehicles are shifting toward greater and greater efficiencies. This effort is, in part, incentivized by government grants, such as the SuperTruck initiative launched in 2009 by the U.S. Department of Energy. The SuperTruck initiative aims to lower carbon emissions and increase freight efficiency of heavy-duty trucks. Thus, increased efficiency of vehicles enhances freight operations while promoting environmental sustainability.

It is with respect to these and other general considerations that the aspects disclosed herein have been made. Also, although relatively specific problems may be discussed herein, it should be understood that the examples should not be limited to solving the specific problems identified in the background or elsewhere in this disclosure.

SUMMARY

Examples of the present disclosure describe pulse turbo charging exhaust systems. In an aspect, a combustion engine is described. The combustion engine includes a cylinder head and an exhaust manifold. The cylinder head includes at least four exhaust ports to receive exhaust gases produced by cylinders of the combustion engine and at least four cylinder head outlets. The cylinder head also includes at least four cylinder head flow paths defined within the cylinder head and fluidly coupling each of the exhaust ports with at least one of the cylinder head outlets. The exhaust manifold includes a first end having exhaust manifold inlets, wherein the first end is couplable to the side of the cylinder head to fluidly couple the exhaust manifold inlets with the cylinder head outlets. The exhaust manifold further includes a second end having a first exhaust manifold outlet and a second exhaust manifold outlet. Additionally, the exhaust manifold includes a first exhaust manifold flow path internal to the exhaust manifold that fluidly couples at least two cylinder head flow paths of the at least four cylinder head flow paths to the first exhaust manifold outlet, wherein the first exhaust manifold flow path is bisectable by a plane. The exhaust manifold also includes a second exhaust manifold flow path internal to the exhaust manifold, separate from the first exhaust manifold flow path, that fluidly couples at least two cylinder head flow paths of the at least four cylinder head flow paths to the second exhaust manifold outlet.

In an example, the exhaust manifold includes a first set of three exhaust manifold inlets and a second set of three exhaust manifold inlets, wherein the first set of three exhaust manifold inlets is fluidly coupled to the first exhaust manifold outlet via the first exhaust manifold flow path, and wherein the second set of three exhaust manifold inlets is fluidly coupled to the second exhaust manifold outlet via the second exhaust manifold flow path. In another example, the exhaust manifold is symmetric about a symmetry plane between the first exhaust manifold flow path and the second exhaust manifold flow path. In a further example, the first exhaust manifold flow path includes: a central branch closest to the symmetry plane having a straight portion; an outer branch furthest from the symmetry plane having an outer curvature; and a middle branch between the central branch and the outer branch having a maximum curvature that is less than the outer curvature of the outer branch. In yet another example, the outer curvature has a minimum radius of 90 mm. In still a further example, the central branch intersects the first end of the exhaust manifold at a first angle, the middle branch intersects the first end of the exhaust manifold at a second angle, and the outer branch intersects the first end of the exhaust manifold at a third angle, wherein the first angle is greater than the second angle, and the second angle is greater than the third angle. In another example, the at least four cylinder head flow paths internal to the cylinder head include six cylinder head flow paths, and wherein the six cylinder head flow paths are curved based on the first angle of the central branch of the exhaust manifold, the second angle of the middle branch of the exhaust manifold, and the third angle of the outer branch of the exhaust manifold. In a further example, the central branch, the outer branch, the middle branch, and at least a portion of the at least four cylinder head flow paths have an equal diameter. In yet another example, the at least one exhaust port, the first exhaust manifold outlet, and the second exhaust manifold outlet are elliptical. In still a further example, the at least one exhaust port, the first exhaust manifold outlet, and the second exhaust manifold outlet are circular.

In another aspect, an exhaust system defining an exhaust flow path for an engine is disclosed. The exhaust flow path includes a set of exhaust inlets fluidly couplable to at least two exhaust ports of the engine, the set of exhaust inlets including a first exhaust inlet and a second exhaust inlet. The exhaust flow path also includes a first exhaust manifold outlet fluidly couplable to a first turbocharger of the engine and a second exhaust manifold outlet fluidly couplable to a second turbocharger of the engine. Additionally, the exhaust flow path includes a first flow path coupling the first exhaust inlet to the first exhaust outlet. The exhaust flow path also includes a second flow path coupling the second exhaust inlet to the second exhaust outlet, wherein the second flow path is independent from and symmetric to the first flow path, and wherein a radius of any curvature along the second flow path is at least 90 mm.

In an example, the set of exhaust inlets includes at least six exhaust inlets, and wherein the first flow path and the second flow path each has an outer branch, a middle branch, and a central branch extending along a plane. In another example, the central branch curves at a central minimum radius of at least 150 mm. In a further example, a middle minimum radius of the middle branch has a radius less than the central minimum radius. In yet another example, the central branch includes a straight portion. In still a further example, the first flow path and the second flow path are symmetric about a symmetry plane, wherein the first flow path and the second flow path each includes a cylinder head portion and an exhaust manifold portion, wherein the cylinder head portion and the exhaust manifold portion are coupled at a coupling surface plane substantially perpendicular to the symmetry plane. In another example, an outer branch of each of the first flow path and the second flow path intersects the attachment line at an angle smaller than a middle branch or a central branch.

In a further aspect, an exhaust manifold having an exhaust flow path is disclosed. The exhaust manifold includes a first end including a first set of three inlets and a second set of three inlets and a second end including a first outlet and a second outlet. The exhaust manifold further includes an exterior wall having a minimum radius of 200 mm. Additionally, the exhaust manifold includes a first flow path internal to the exterior wall of the exhaust manifold, the first flow path fluidly coupling the first set of three inlets to the first outlet, and wherein the first flow path includes an outer branch, a middle branch, and a central branch. The exhaust manifold also includes a second flow path internal to the exterior wall of the exhaust manifold, the second flow path fluidly coupling the second set of three inlets to the second outlet, and wherein the second flow path is separate from and symmetrical to the first flow path.

In an example, an outer radius associated with the outer branch has the minimum radius and wherein a middle minimum radius associated with the middle branch and a central minimum radius associated with the central branch are each greater than the minimum radius. In another example, at least a portion of the exterior wall associated with the central branch is straight.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 4I-4J depict cross-sectional views of the exhaust manifold of FIG. 4A.

DETAILED DESCRIPTION

Vehicles are shifting toward greater and greater efficiencies. This effort is, in part, incentivized by government grants, such as the SuperTruck initiative launched in 2009 by the U.S. Department of Energy. The SuperTruck initiative aims to lower carbon emissions and increase freight efficiency of heavy-duty trucks. Thus, increased efficiency of vehicles enhances freight operations, while promoting environmental sustainability.

Efficiency may be improved by changing a flow path of exhaust between the cylinders of an engine and inlet(s) to one or more turbochargers. The exhaust flow path may be formed in a cylinder head and/or an exhaust manifold. For instance, a change in shape and size of an exhaust flow path through the cylinder head and/or the exhaust manifold may improve engine efficiency by conserving thermal energy and blowdown energy (e.g., kinetic energy). The flow paths may be shaped to reduce the sharpness of turns. For example, curves along the flow path may be less than 90 degrees or have a minimum curve radius. Stated differently, a radius of any curvature along the flow path (which may vary along the flow path) may be at least 70 mm, at least 80 mm, at least 90 mm, or greater. This includes curves in any direction, such as up, down, right, or left, relative to the engine. By reducing severity of curves in the flow paths, the velocity and heat of gases are preserved.

Additionally, depending on the firing order of the engine and rotation angle of the crankshaft, joining or merging flow paths from multiple cylinders may impede exhaust flow. To reduce conflicts in air flow, solutions provided below describe independent groupings of flow paths with at least two outlets for exhaust to exit the exhaust manifold and feed one or more turbochargers. For instance, the exhaust from the front cylinders (e.g., first three cylinders of a six-cylinder engine) may be combined separately from the exhaust from the back cylinders (e.g., last three cylinders of the six-cylinder engine), each of which may be fluidly coupled with a different turbine of one or more turbochargers.

The cross-sectional shape and size of the exhaust ports in the cylinder head (e.g., where the cylinder head couples to cylinder(s)), as well as the size and shape of the exhaust manifold outlets (e.g., where the exhaust manifold couples with turbocharger(s)), may also be modified. In some prior designs, one or more sections of a flow path from cylinder to turbocharger may have been rectangular in cross section. Shapes with corners or non-smoothed edges, however, may impede air flow or cause eddies in air flow in the exhaust manifold. For example, a rectangular port may not conserve as much blowdown energy or thermal energy as an ovular or round port.

Figure 1:
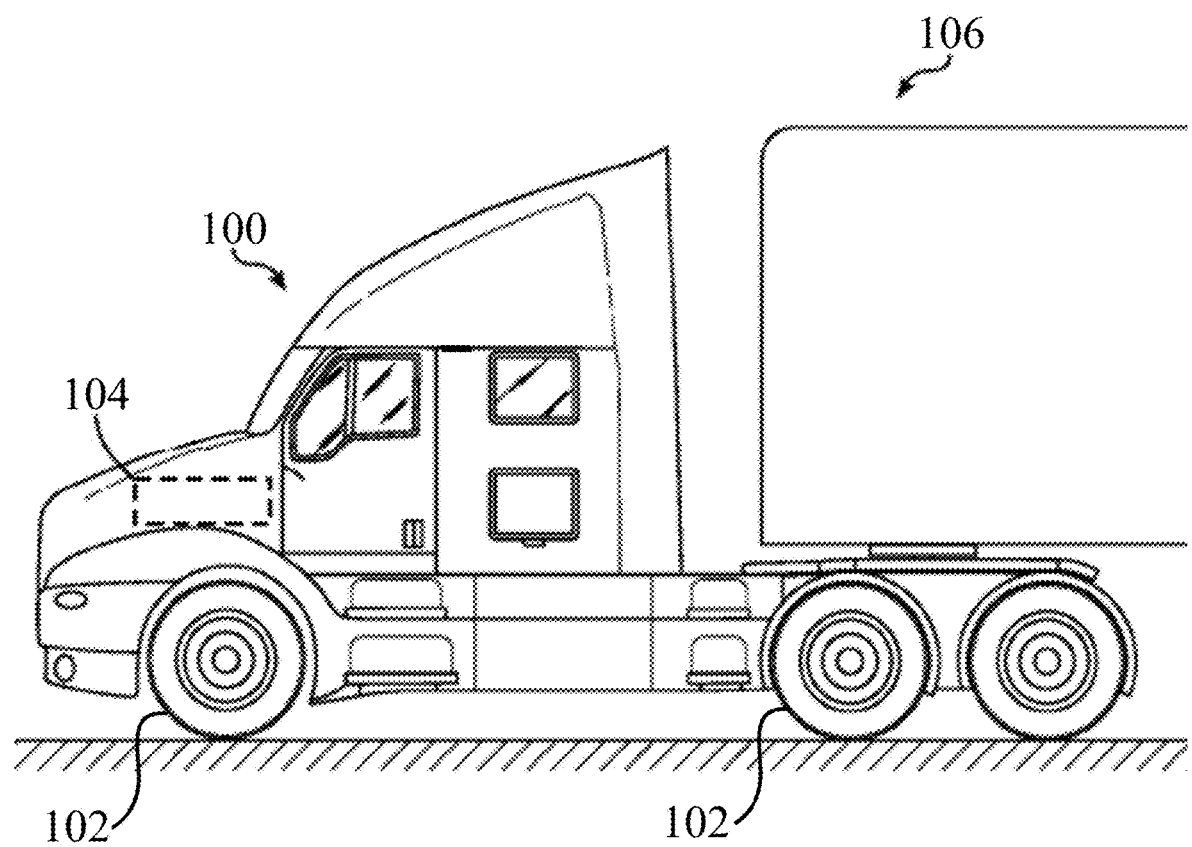
FIG. 1 depicts a side view of a vehicle.

FIG. 1 depicts a side view of a vehicle 100. In the example depicted, the vehicle 100 is a truck with a chassis supported by wheels 102. The vehicle 100 may be a part of a tractor-trailer combination, or tractor-trailer system, which may include the vehicle 100 having a so-called fifth wheel by which a box-like, flat-bed, or tanker semi-trailer 106 (among other examples) may be attached for transporting cargo or the like. While the vehicle 100 is depicted as a truck in FIG. 1, it should be appreciated that the present technology is applicable to any type of vehicle where an exhaust manifold having properties to increase engine efficiency is required or desired.

The example vehicle 100, otherwise referred to herein as a truck, tractor, or cab, includes a cabin from which a driver may steer the vehicle 100. The vehicle may include a power and control system 104 to operate the vehicle 100. The power and control system 104 includes an engine. As described herein, an engine with a greater efficiency may be desirable. Some ways to increase engine efficiency include specific geometries of an exhaust flow path between the cylinders and at least one turbocharger inlet. For example, the exhaust flow path geometry may have reduced sharpness of turns, increased quantity of independent flow paths to the turbocharger(s), and changed shape and/or diameter of the exhaust flow paths. The components and operations of example exhaust flow paths, exhaust manifolds, and cylinder heads are discussed in further detail, below.

Figure 2:
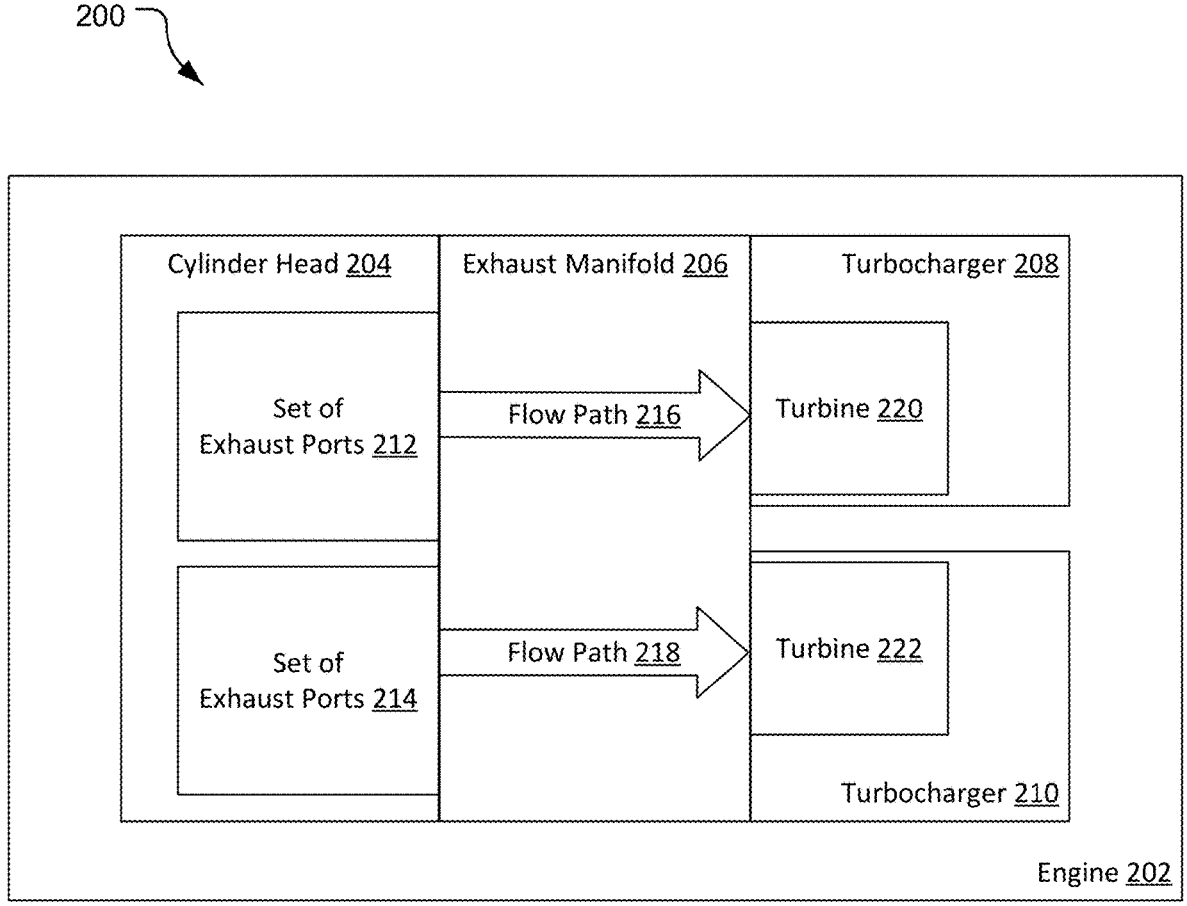
FIG. 2 depicts an example schematic of a flow path of exhaust from engine cylinders through an exhaust manifold to turbochargers.

FIG. 2 depicts a conceptual schematic 200 of flow paths 216, 218 of exhaust through a cylinder head 204 and an exhaust manifold 206 into turbochargers 208, 210. The components described with respect to FIG. 2 include some components of the engine 202 of a vehicle (e.g., vehicle 100 described in FIG. 1). The engine 202 includes other components not shown and/or described, such as pistons, cylinders, a crankshaft, a combustion chamber, a valve train, fuel injectors, fuel pumps, spark plugs, a transmission, etc.

In the schematic 200 shown in FIG. 2, exhaust gases originate from cylinders and flow into the cylinder head 204 through a set of exhaust ports 212, 214. Each set of exhaust ports 212, 214 may be located or oriented differently. For example, the engine 202 may include cylinders (and exhaust ports) in a "v" formation, block formation, etc. Regardless of the relative positioning, orientation, or crankshaft angle of the set of exhaust ports 212, 214, exhaust from one set of exhaust ports 212 and another set of exhaust ports 214 may flow separately or independently through the cylinder head, through the exhaust manifold, and into turbocharger(s). Depending on the geometry of the set of exhaust ports 212, 214 relative to a crankshaft, the cylinders for each set of exhaust ports 212, 214 may fire at different crankshaft angles. For example, cylinders may fire at a crankshaft angle of 90 degrees, 120 degrees, 180 degrees, or any other angle. Sets of exhaust ports 212, 214 may be grouped for independent flow paths 216, 218 depending on the crankshaft angle separation of the cylinders (e.g., as described herein, the front cylinders and the back cylinders may be grouped).

The exhaust manifold 206 is positioned between the cylinder head and the turbocharger(s) to fluidly couple cylinder head outlets on the cylinder head 204 (e.g., which may be associated with the set of exhaust ports 212, 214) to turbochargers 208, 210. The coupling of the exhaust manifold 206 with the exhaust ports, the cylinder head 204 with the cylinders (e.g., via a set of exhaust ports 212, 214), and the exhaust manifold 206 with the turbochargers 208, 210 may each be airtight so as not to allow escape of gases. As shown, the exhaust manifold 206 includes two flow paths 216, 218, each allowing flow of exhaust from respective, originating sets of exhaust ports 212, 214. Although two flow paths 216, 218 are shown, there may be two or more independent flow paths through the exhaust manifold 206. For example, a third set of cylinder heads may produce exhaust that flows through a third flow path (not shown). Additionally, each cylinder of the engine may have any number of associated exhaust ports, such as one, two, three, or more.

As shown, each flow path may combine exhaust gases from multiple exhaust ports (e.g., from at least one cylinder). For example, a first set of exhaust ports 212 may include four, five, six, or more exhaust ports that are included and fluidly coupled with a first flow path 216 to a first turbocharger 208. In an example where a pair of exhaust ports are associated with a single cylinder, the exhaust flow path may first combine the flow of exhaust gases from the pair of exhaust ports into a branch prior to combining branches. In an instance where a first set of exhaust ports 212 includes six exhaust ports from three cylinders (e.g., ports 1-6, with ports 1-2 associated with a first cylinder, ports 3-4 associated with a second cylinder, and ports 5-6 associated with a third cylinder), port 1 and port 2 may be combined into a first branch, port 3 and port 4 may be combined into a second branch, and port 5 and port 6 may be combined into a third branch. The first branch may then be combined with the second branch, the combination of which may then be combined with the third branch (e.g., flow path 216) to direct exhaust gases into the turbocharger 208. Similarly, exhaust ports 214 may include four, five, six, or more exhaust ports that are included and combined into a flow path 218 directed to turbocharger 210. Example flow paths through the cylinder head 204 and exhaust manifold 206 are described at least with respect to FIGS. 3A-3B, 4A-4J, 5A-5E, 6A-6C, and 7A-7B.

Exhaust from the cylinder head 204 is provided to turbines 220, 222 of turbochargers 208, 210. Velocity of the exhaust gases may act to turn the turbines 220, 222 to help power the turbochargers 208, 210. The greater the velocity of exhaust gases fed into the turbines 220, 222, the less energy required to power the turbochargers 208, 210 (e.g., less energy to power a compressor of a turbocharger). Thus, the greater the velocity of exhaust gases, the more energy conserved (e.g., conservation of both thermal and kinetic energy) and the more efficient the engine 202. Geometry of the flow paths 216, 218 may aid in the conservation of velocity of exhaust gases from the set of exhaust ports 212, 214 to the turbines 220, 222. Geometry of the flow paths 216, 218 are further described herein.

Figure 3A:
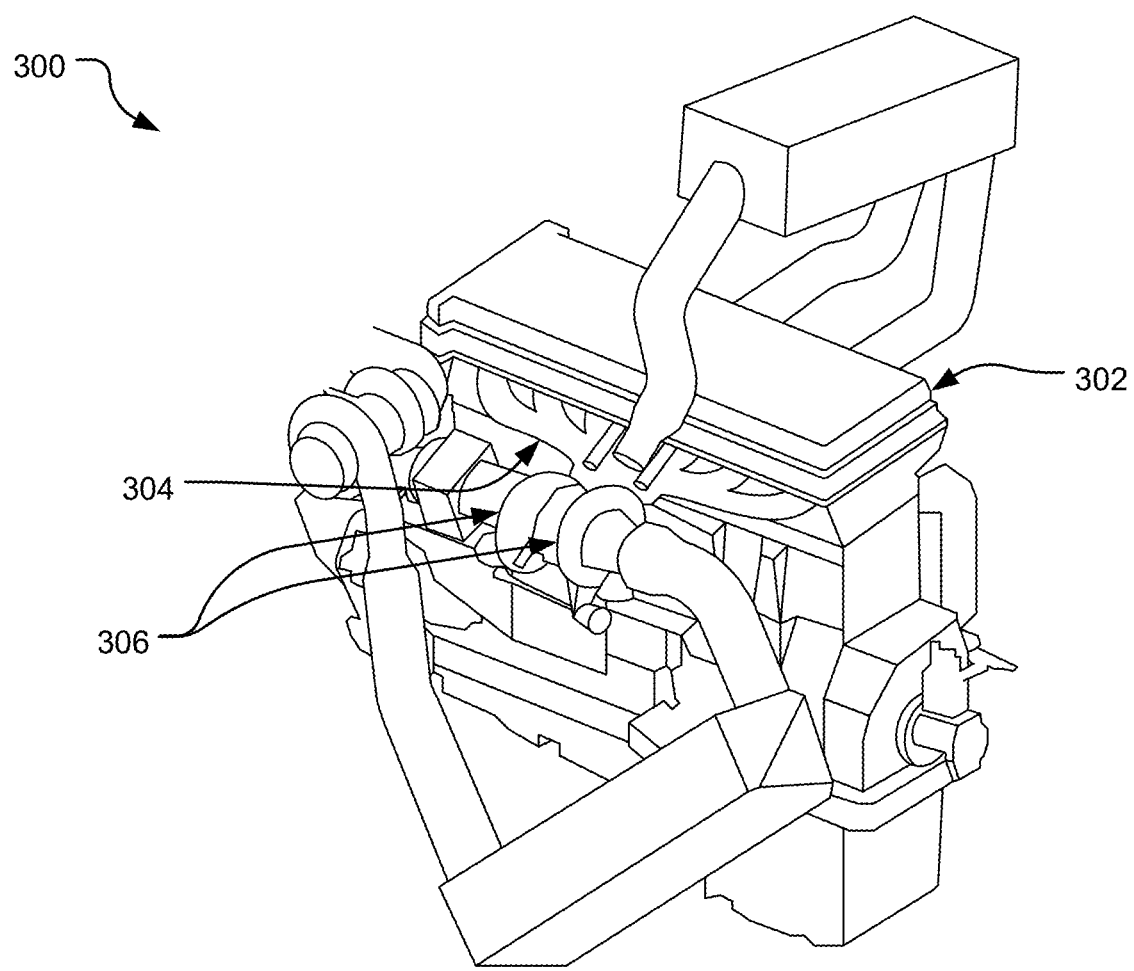
FIG. 3A depicts an engine of a vehicle with a cylinder head, an exhaust manifold, and a turbocharger.
Figure 3B:
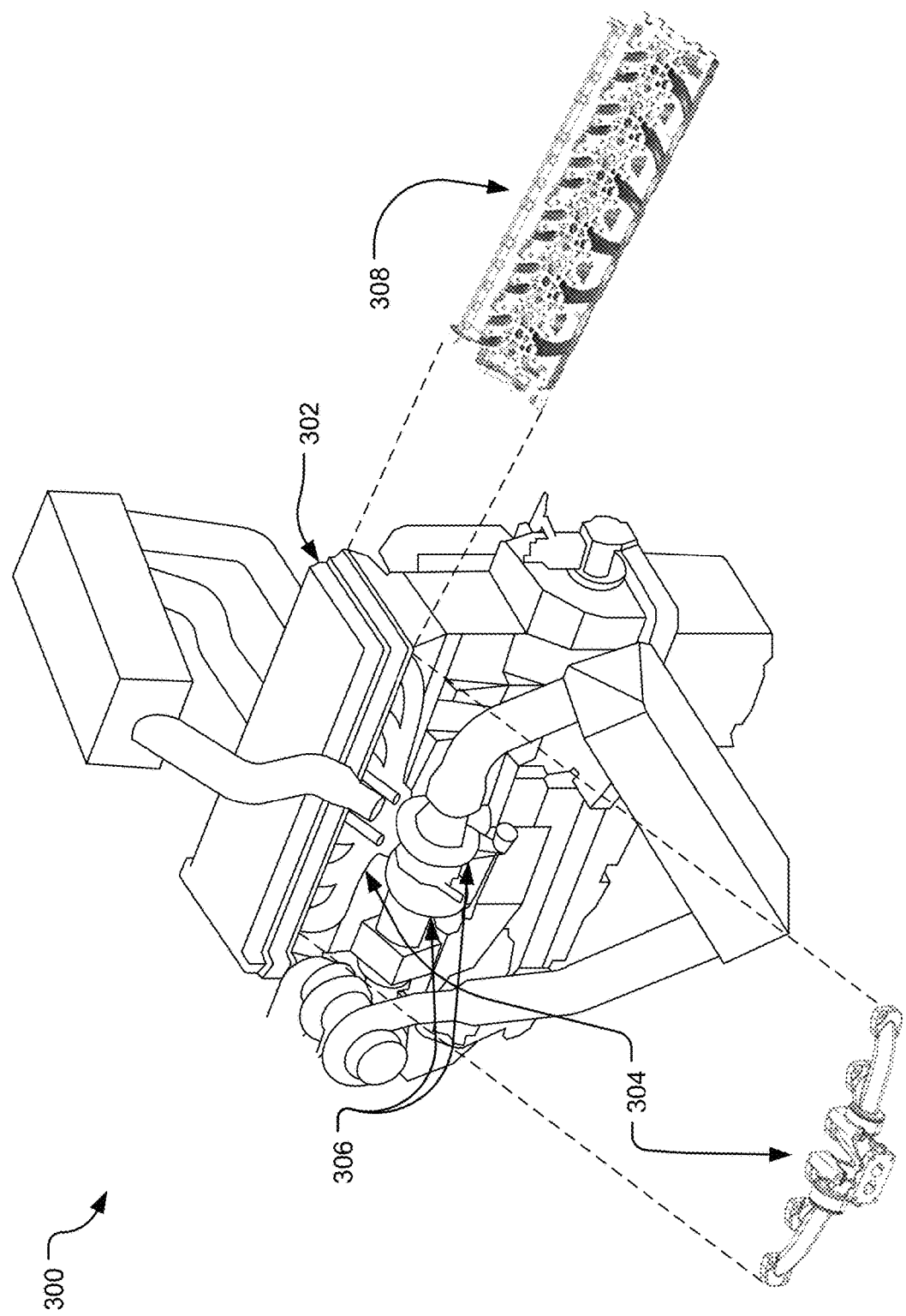
FIG. 3B depicts an exploded view of the engine of FIG. 3A, including the exhaust manifold and a cross-sectional view of the cylinder head.

FIGS. 3A-3B depict different views of an engine 300 of a vehicle (e.g., vehicle 100). FIG. 3A depicts an engine 300 of a vehicle with a cylinder head 302, an exhaust manifold 304, and turbochargers 306. FIG. 3B depicts the exhaust manifold 304 and a cross-sectional view of the cylinder head 302 exploded from the engine 300 of FIG. 3A.

Exhaust gases flow from exhaust ports through the cylinder head 302 and through the exhaust manifold 304. As shown, the engine 300 includes twelve exhaust ports (six pairs of exhaust ports). The cylinder head 302 includes exhaust flow paths to fluidly couple the exhaust ports with flow paths through the exhaust manifold 304. Flow of exhaust from each pair of exhaust ports is an independent flow path through the cylinder head 302. In the example shown in FIGS. 3A-3B, there are six, independent flow paths, for exhaust through the cylinder head 302 (e.g., one flow path for each cylinder, also one flow path for each pair of exhaust ports), with six cylinder head outlets, respectively. Exhaust gases flow from the cylinder head outlets on the cylinder head 302 into exhaust manifold inlets of the exhaust manifold 304. Exhaust gases may travel through at least two, independent flow paths in the exhaust manifold 304. In the example shown in FIGS. 3A-3B, the front six exhaust ports are joined into a first flow path of the exhaust manifold 304 and the back six exhaust ports are joined into a second flow path of the exhaust manifold 304 (e.g., the front three outlets of the cylinder head 302 are combined and the back three outlets of the cylinder head 302 are combined). The two, independent flow paths in the exhaust manifold 304 may each feed into the two turbochargers 306, respectively. For instance, the first flow path with exhaust from the front six exhaust ports couples to a first turbine of a first turbocharger and the second flow path with exhaust from the back six cylinders couples to a second turbine of a second turbocharger. Further description of the exhaust manifold 304, the cylinder head 302, and various flow paths of exhaust are described at least with respect to FIGS. 4A-4J, FIGS. 5A-5E, and FIGS. 6A-7B, respectively.

Figure 4A:
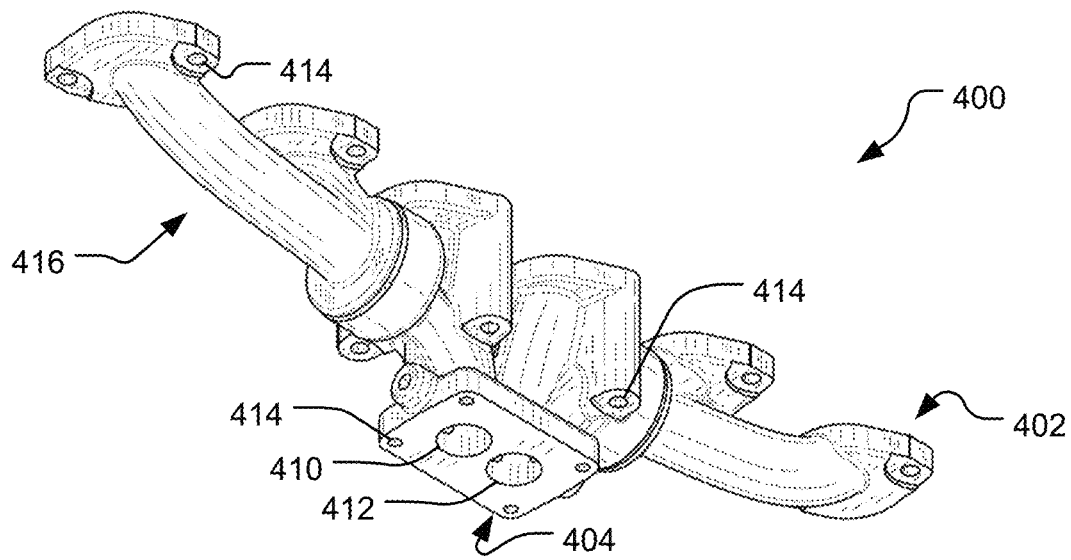
FIG. 4A depicts a perspective view of an exhaust manifold.
Figure 4B:
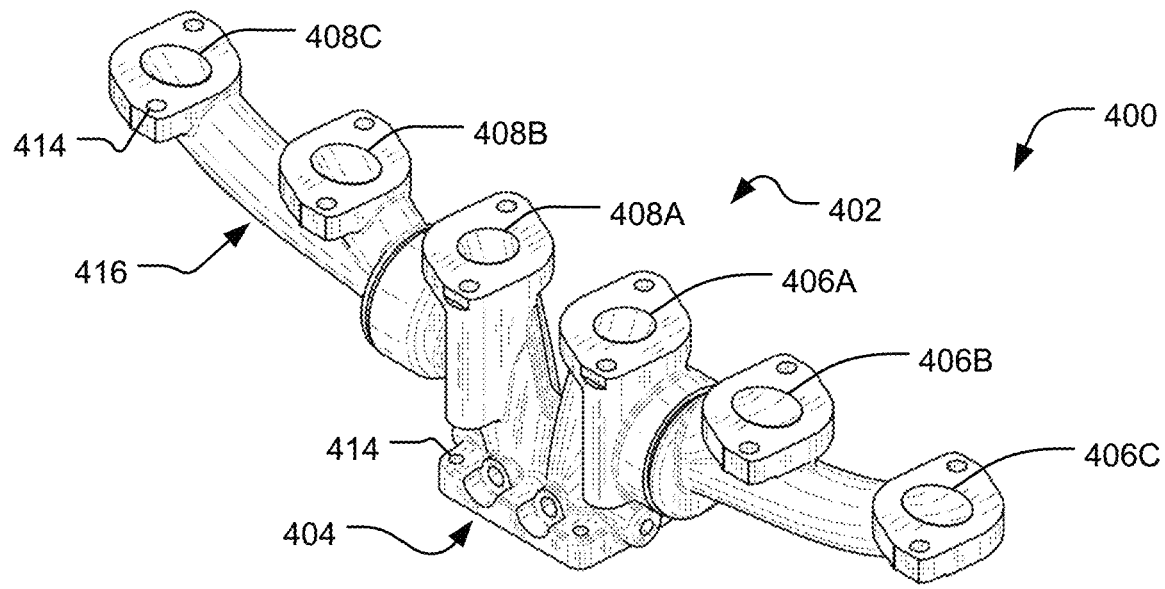
FIG. 4B depicts another perspective view of the exhaust manifold of FIG. 4A.
Figure 4C:
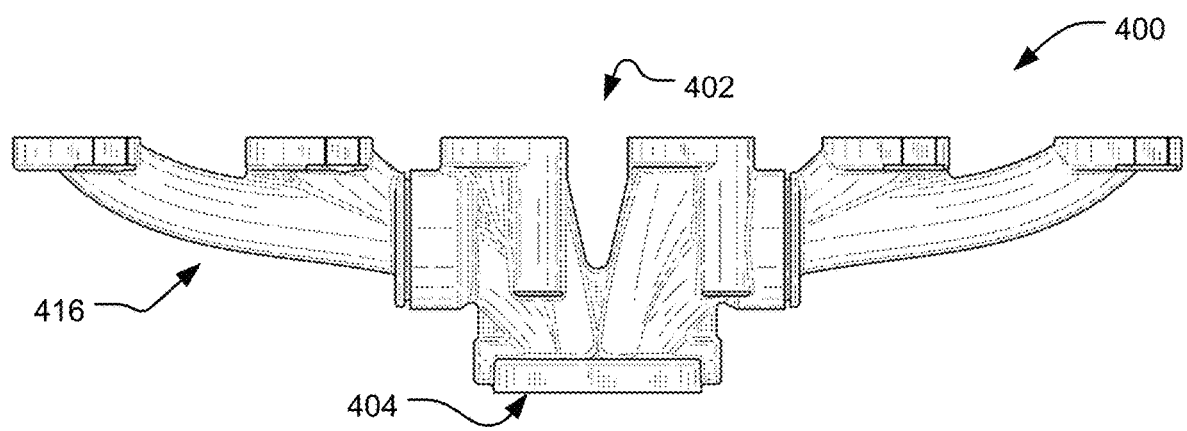
FIG. 4C depicts a top-down view of the exhaust manifold of FIG. 4A.
Figure 4D:
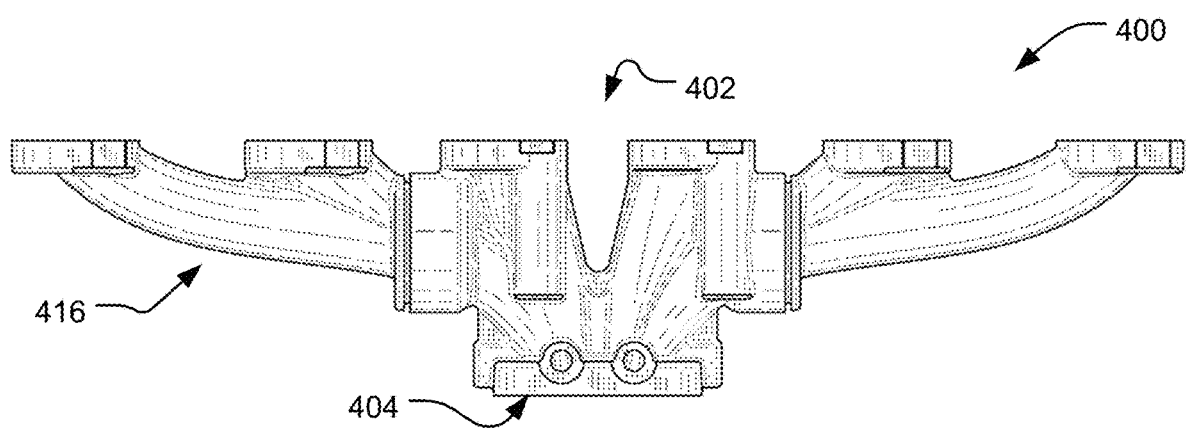
FIG. 4D depicts a bottom-up view of the exhaust manifold of FIG. 4A.
Figure 4E:
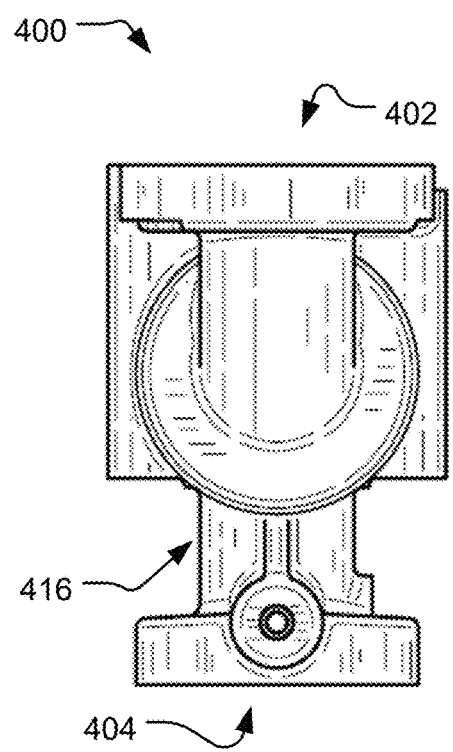
FIGS. 4E-4F depict side views of the exhaust manifold of FIG. 4A.
Figure 4F:
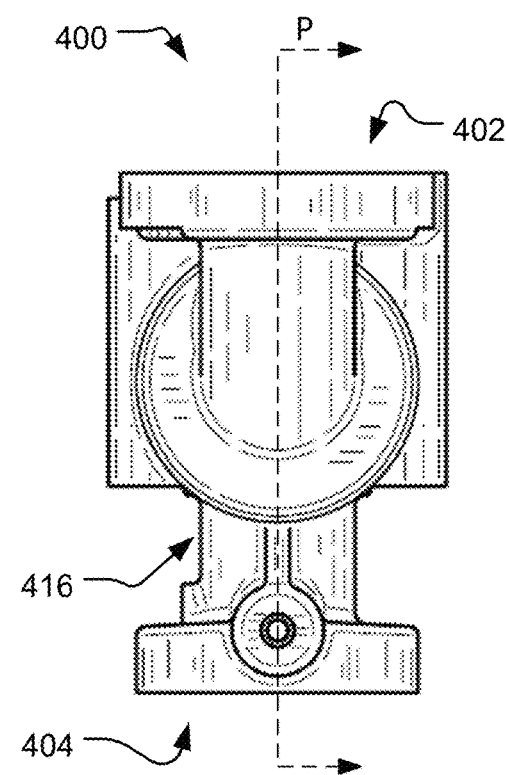
Figure 4G:
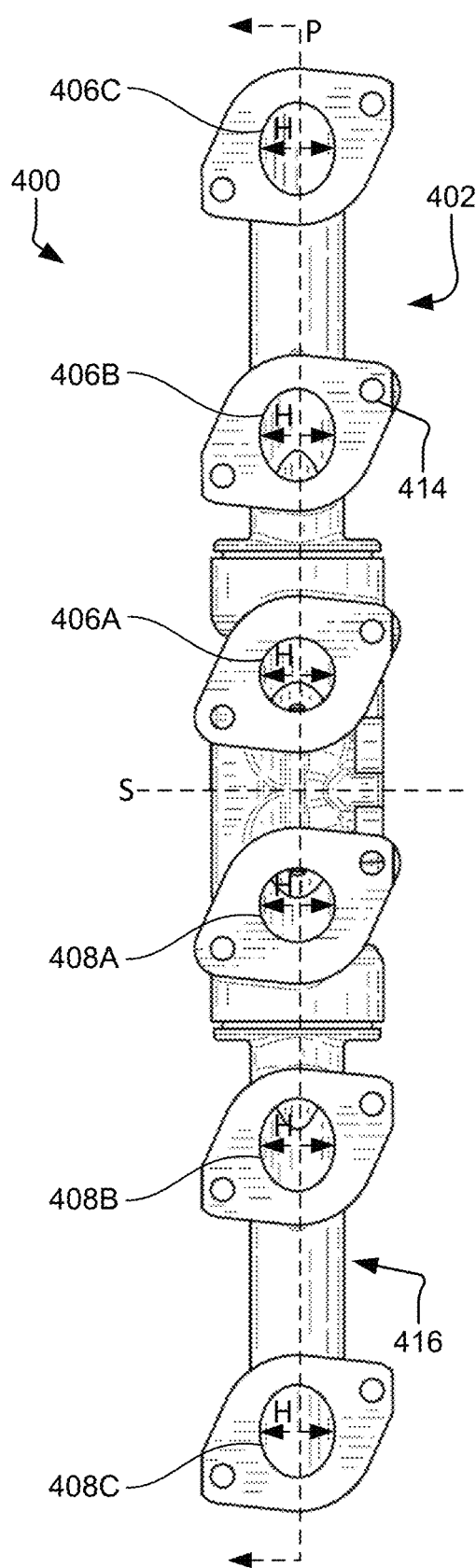
FIG. 4G depicts an outlet-side view of the exhaust manifold of FIG. 4A.
Figure 4H:
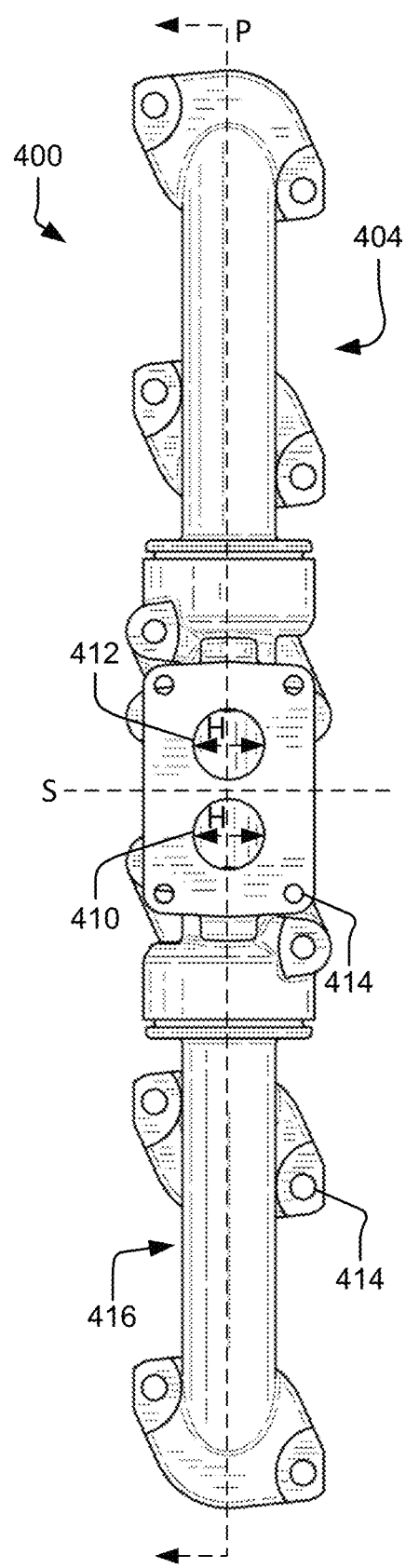
FIG. 4H depicts an inlet-side view of the exhaust manifold of FIG. 4A.

FIGS. 4A-4J depict different views of an exhaust manifold 400. In particular, FIG. 4A depicts a perspective view of the exhaust manifold 400 and FIG. 4B depicts another example view of the exhaust manifold of FIG. 4A. FIG. 4C depicts a top-down view of the exhaust manifold 400, FIG. 4D depicts a bottom-up view of the exhaust manifold 400, FIGS. 4E-4F depict side views of the exhaust manifold 400, FIG. 4G depicts an outlet-side view of the exhaust manifold 400, FIG. 4H depicts an inlet-side view of the exhaust manifold, and FIGS. 4I-4J depict cross-sectional views along cutting plane P of the exhaust manifold 400.

In the exhaust manifold 400 shown, the exterior shape of the exhaust manifold 400 follows the geometry of one or more flow paths inside the exhaust manifold 400. Examples of flow paths through the exhaust manifold 400 are described herein at least with respect to FIGS. 6A-7B. For instance, if a curvature of the flow paths F1, F2 is different than the curvature shown in FIGS. 4I-4J, then the exterior shape of the exhaust manifold 400 (e.g., the shape shown in FIGS. 4A-4J) may change accordingly. The exhaust manifold 400 may be casted. The exhaust manifold may be a single piece. All or a portion of the exhaust manifold 400 may be coated with a thermal barrier coating insulation to reduce heat transfer and insulate the exhaust flow paths F1, F2.

As shown, the exhaust manifold 400 includes inlet surfaces 402 (otherwise referred to herein as a coupling surface of the exhaust manifold 400 to couple with a cylinder head), an outlet surface 404, exhaust manifold inlets 406A-C, 408A-C (which, when referring to a flow path of exhaust through the exhaust manifold 400 may be referred to as exhaust inlets), exhaust manifold outlets 410, 412, coupling holes 414, a symmetry plane S, and exhaust flow paths F1, F2.

The inlet surfaces 402 may couple to a cylinder head of an engine such that exhaust manifold inlets 406A-C, 408A-C are aligned with exhaust flow paths exiting the cylinder head (e.g., cylinder head outlets 506A-C, 508A-C in FIGS. 5A-D). Coupling of the inlet surfaces 402 of the exhaust manifold 400 may be facilitated via coupling holes 414 (some, but not all, labelled in FIGS. 4A-4J). For example, screws, bolts, or other coupling mechanisms may couple the inlet surfaces 402 to a cylinder head via one or more coupling holes 414. Exhaust manifold inlets 406A-C, 408A-C on the inlet surfaces 402 of the exhaust manifold 400 may thereby be fluidly coupled to one or more exhaust flow paths in the cylinder head with an airtight seal. Thus, the coupling of the exhaust manifold 400 with the cylinder head may form a seal (e.g., by placing a gasket between them, or otherwise) to allow exhaust gases to travel through the cylinder head and into the exhaust manifold at the exhaust manifold inlets 406A-C, 408A-C without allowing escape of exhaust gases.

Exhaust gases entering the exhaust manifold 400 at the exhaust manifold inlets 406A-C, 408A-C travels through at least two, independent exhaust flow paths F1, F2 inside of the exhaust manifold 400. In the example shown, the exhaust manifold 400 has two exhaust flow paths F1, F2. The first exhaust flow path F1 fluidly couples and combines a first set of exhaust manifold inlets 406A-C and the second exhaust flow path F2 fluidly couples and combines a second set of exhaust manifold inlets 408A-C. The exhaust flow paths F1, F2 may be symmetric about a symmetry plane S of the exhaust manifold 400. In an instance, each of the exhaust flow paths F1, F2 may fluidly couple consecutive exhaust manifold inlets 406A-C, 408A-C. In another instance, the exhaust manifold inlets 406A-C, 408A-C and the exhaust manifold outlets 410, 412 are symmetric about a symmetry plane S. The exhaust flow paths F1, F2 may have a constant diameter at inlets and outlets and along each branch of the exhaust flow path F1, F2, e.g., 37 mm, 37.5 mm, 38 mm, 38.1 mm, 40 mm, etc. Additionally or alternatively, the exhaust flow paths F1, F2 may have a constant cross-sectional area. In examples, "constant" means not varying by more than one percent, by more than three percent, or by more than five percent. The cross-sectional area may be based on predetermined shape dimensions of a cross-section of the flow path F1, F2, such as a circular with a known diameter (e.g., 37 mm, 37.5 mm, 38 mm, 38.1 mm, 40 mm, etc.). The diameter of the cross-section may be defined at a point where the exhaust manifold 400 and cylinder head couple together (e.g., the transition of the exhaust flow path from the cylinder head to the exhaust manifold 400). Depending on an angle at which the flow paths F1, F2 intersect the inlet surfaces 402, the shape of the exhaust manifold inlets 406A-C, 408A-C may be an ellipse with an equal major and minor axis (e.g., a circle, in an example where the intersect angle is perpendicular) or an ellipse with an unequal major and minor axis (e.g., an elongate ellipse, where the intersect angle is anything other than perpendicular). Each exhaust flow path F1, F2 may connect a first end of the exhaust manifold 400 (e.g., at an exhaust manifold inlet 406A-C, 408A-C along the inlet surface 402) with a second end of the exhaust manifold (e.g., at an outlet 410, 412 along an outlet surface 404). Each exhaust flow path F1, F2 may combine multiple branches into a single limb to cause exhaust gases to exit the exhaust manifold via a single exhaust manifold outlet 410, 412 at an outlet surface 404.

The exhaust manifold 400, and its exhaust flow paths F1, F2, may be geometrically shaped to conserve kinetic and thermal energy of exhaust gases originating from exhaust ports of a cylinder head. As described herein, the exhaust manifold 400 includes at least two, independent exhaust flow paths F1, F2. In examples, the exhaust flow paths F1, F2 through exhaust manifold 400 may be bisectable by, or run parallel to, a single plane (e.g., the exhaust flow paths F1, F2 are bisected by cutting plane P as shown in FIGS. 4G-4J). Additionally, the exhaust flow paths F1, F2 may be symmetric about a plane (e.g., cutting plane P). In an example, the exhaust flow paths F1, F2 are symmetric about two planes (e.g., a plane bisecting the exhaust flow paths F1, F2, such as cutting plane P, and a symmetry plane running between the exhaust flow paths F1, F2 and perpendicular to the bisecting plane, such as a plane along the symmetry plane S and perpendicular to the cutting plane P). Thus, the exhaust flow paths F1, F2 may be both independent from each other and symmetric to each other. Separating the exhaust flow paths originating from some cylinders may reduce counterflow from cylinders angled opposite each other with respect to the crankshaft angle. By separating exhaust flows from cylinders having opposing directions, velocity of exhaust gases may be conserved without being reduced. Additionally, the exhaust manifold inlets 406A-C, 408A-C of the exhaust manifold 400 may have an elliptical shape coupling to an exhaust port on a cylinder head of a same or similar shape. In some instances, the elliptical shape may be circular (e.g., an ellipse with major and minor axes equal in length).

The smoothed shape of the exhaust manifold inlets 406A-C, 408A-C of the exhaust manifold also conserve kinetic and thermal energy. Curvature along each exhaust flow path F1, F2 is also designed for energy conservation. As shown, curves along each exhaust flow path F1, F2 are tapered to elongated, smooth bends. Curvature along each branch of the flow path F1, F2 (e.g., an outer branch, a middle branch, and a central branch) may have a variable radius of curvature, each of which may have a minimum radius. For example, the curvature along a single branch may begin with a minimum radius (e.g., the sharpest portion of the curvature) and taper to a larger radius (e.g., a smoother portion of the curvature). In an example, the maximum curvature along an exterior wall 416 of any section of each exhaust flow path F1, F2 in exhaust manifold 400 and curvature along an interior wall 418 of any section of each exhaust flow path F1, F2 may be less than 90 degrees, less than 80 degrees, less than 75 degrees, or have a radius greater than 90 mm, 95 mm, 100 mm, or more. Curvatures of branches of the exhaust flow paths F1, F2 that are closer to the center of the exhaust manifold (e.g., closer to the symmetry plane S) may have less curvature than branches of the exhaust flow paths F1, F2 that are further from the center of the exhaust manifold (e.g., further from the symmetry plane S). For example, branches stemming from central exhaust manifold inlets 406A, 408A may curve at smaller angles (or larger radii) than branches stemming from outer exhaust manifold inlets 406B, 408B, which may curve at smaller angles (or larger radii) than branches stemming from outer exhaust manifold inlets 406C, 408C.

In an instance, a central radius of central flow paths (e.g., central portions of the flow paths F1, F2 stemming from central exhaust manifold inlets 406A, 408A) is at least 400 mm, 425 mm, 450 mm, 475 mm, or more. In another instance, an outer radius of outer flow paths (e.g., outer portions of the flow paths F1, F2 stemming from outer exhaust manifold inlets 406C, 408C) is at least 150 mm, 175 mm, 200 mm, 219 mm, 250 mm, or more. The middle radius of middle flow paths (e.g., middle portions of the flow paths F1, F2 stemming from middle exhaust manifold inlets 406B, 408B) has a radius with a range between the central radius and the outer radius, such as 150 mm to 475 mm, 219 mm to 475 mm, etc. An outlet radius of the flow paths F1, F2 after the junction of the central branch, middle branch, and outer branch, may have an outlet radius of at least 90 mm, 95 mm, 100 mm, or more.

The central exhaust manifold inlets 406A, 408A may have curvature in only one direction. Alternatively, the outer exhaust manifold inlets 406B, 406C, 408B, 408C may curve in at least two directions. The branches of each exhaust flow path F1, F2 may be combined from outer-most branches inward. For example, the outer-most branch stemming from outer exhaust manifold inlet 406C, 408C may be combined with the outer branch stemming from outer exhaust manifold inlet 406B, 408B (respectively), with that combined branch combining with the central branch stemming from central exhaust manifold inlet 406A, 408A (respectively), to extend to an exhaust manifold outlet 410, 412 (respectively). Other geometrical features of the exhaust flow paths F1, F2 through the exhaust manifold 400 are described at least with respect to FIGS. 6A-6C, 7A-7B.

Each of the exhaust manifold outlets 410, 412 is sized and shaped to fluidly couple to an inlet of a turbine of a turbocharger. As described above, the exhaust flow paths F1, F2 may have a constant diameter along each branch. In this instance, each exhaust manifold outlet 410, 412 has the size and shape of a cross-section of each branch of the exhaust manifold 400 (e.g., an elliptical shape). Depending on a junction angle (e.g., junction angles $\theta$, $\alpha$, $\beta$, $\gamma$, $\delta$, $\varepsilon$, $\zeta$ in FIGS. 6A-6C) at which the exhaust manifold inlets 406A-C, 408A-C couple to the cylinder head outlets at coupling surfaces (e.g., cylinder head outlets 506A-506C, 508A-508C in FIGS. 5A-5E), the exhaust manifold inlets 406A-C, 408A-C may have a same or different shape than the exhaust manifold outlets 410, 412. In an example where the junction angle is 90 degrees (e.g., junction angle $\theta$ in FIG. 6A), the exhaust manifold inlets 406A-C, 408A-C are the same size and shape as the exhaust manifold outlets 410, 412 (e.g., the coupling surface of the exhaust manifold inlet is perpendicular to the flow path). Alternatively, in an example where the junction angle is not 90 degrees (e.g., see at least the exhaust manifold inlets 406B, 406C, 408B, 408C in FIG. 4G), the exhaust manifold inlets 406A-C, 408A-C are elongated in at least one direction (e.g., in a direction of the bisecting plane along the exhaust flow paths F1, F2) relative to the size and shape of the exhaust manifold outlets 410, 412. For instance, the exhaust manifold inlets 406A-C, 408A-C may be elliptical with a constant height diameter H (e.g., along a minor axis of the ellipse) and a varying length diameter (e.g., along a major axis of the ellipse) that is longer than the height diameter (e.g., the outer exhaust manifold inlets 406C, 408C may have a longer length diameter than the middle exhaust manifold inlets 406B, 406C, which may have a longer length diameter than the central exhaust manifold inlets 406A, 408A, which may have a length diameter greater than or equal to the length diameter of the exhaust manifold outlets 410, 412). The outlet surface 404 may be coupled to two or more independent fluid pathways feeding one or more turbines of one or more turbochargers. For example, the exhaust manifold outlet 410 of the first exhaust flow path F1 may be couplable to a first turbine and the exhaust manifold outlet 412 of the second exhaust flow path F2 may be couplable to a second turbine. Coupling of the outlet surface 404 may be facilitated via one more coupling holes 414. The coupling may form an airtight seal that may, in examples, be facilitated by use of a gasket.

Figure 5A:
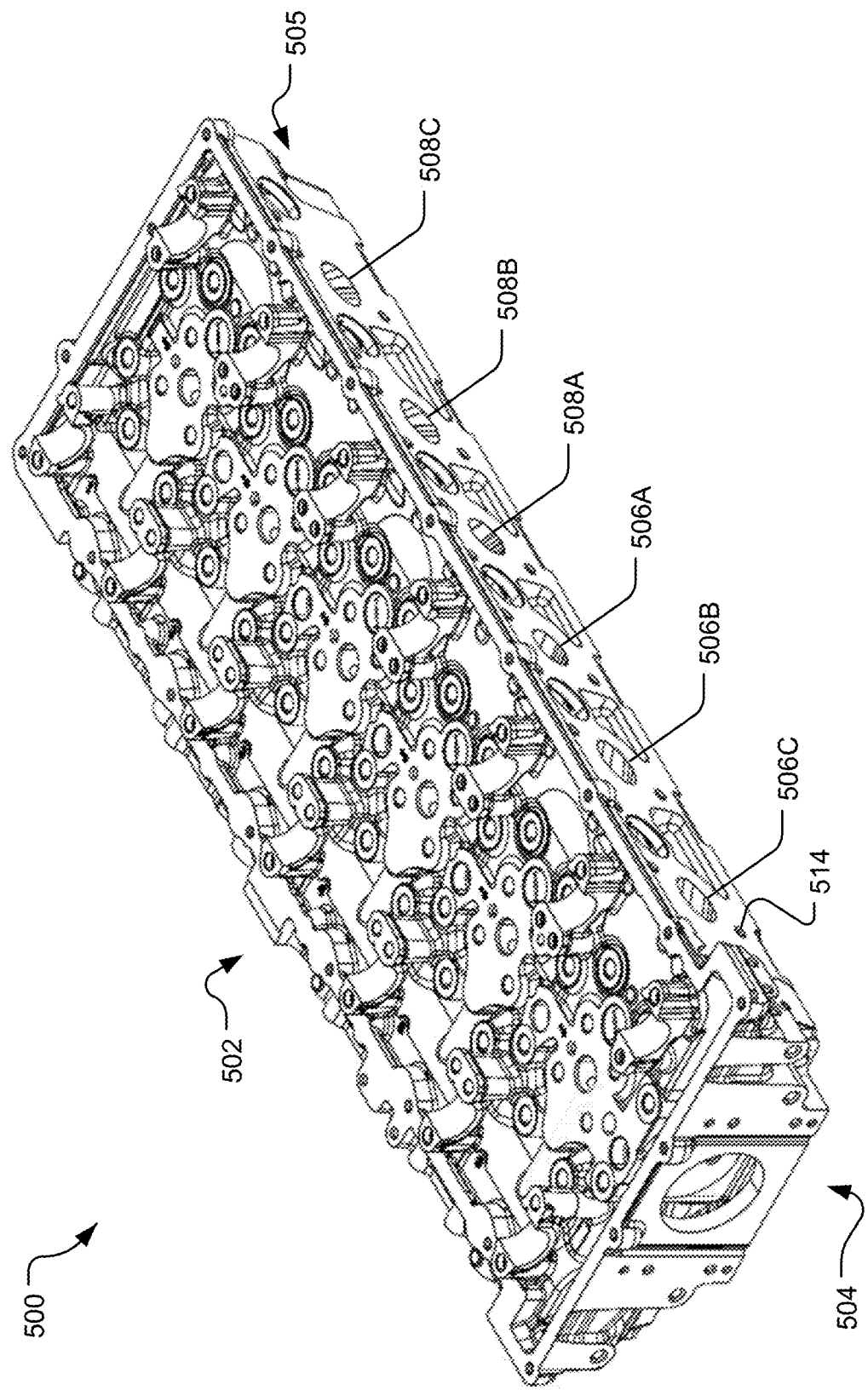
FIG. 5A depicts a perspective view of a cylinder head of an engine.
Figure 5B:
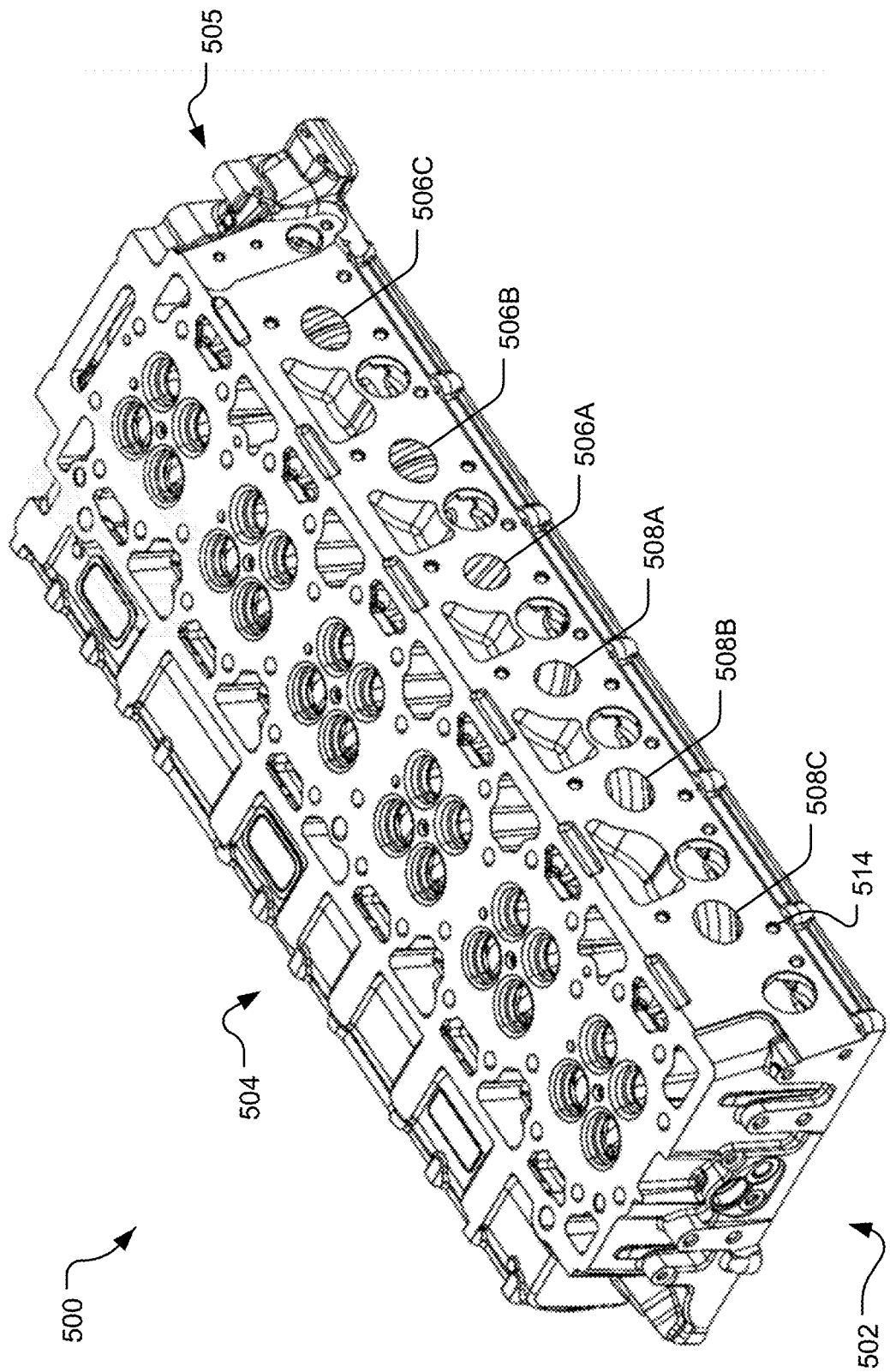
FIG. 5B depicts a bottom perspective view of the cylinder head of FIG. 5A.
Figure 5C:
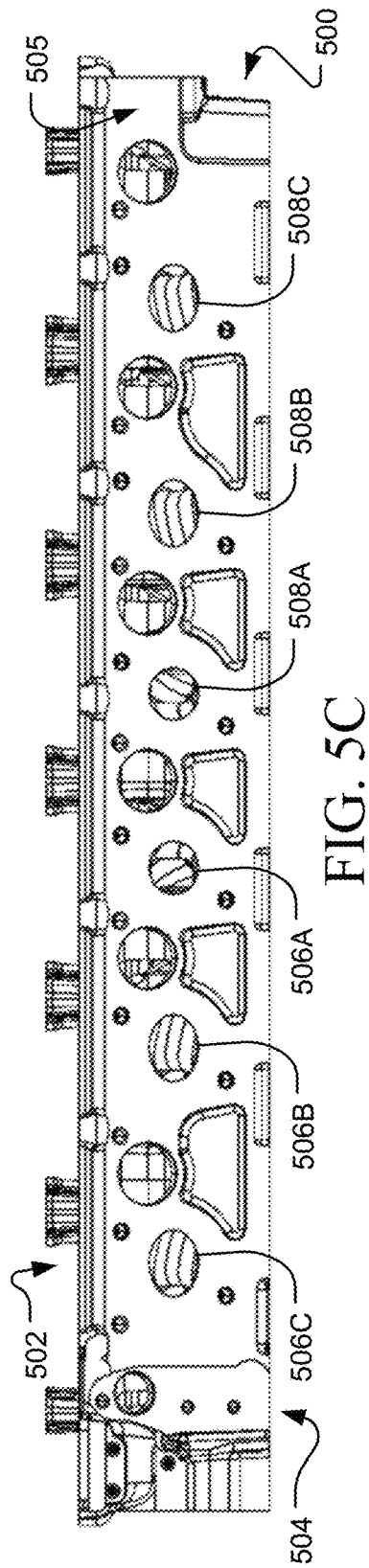
FIG. 5C depicts a side view of the cylinder head of FIG. 5A, including exhaust outlets.
Figure 5D:
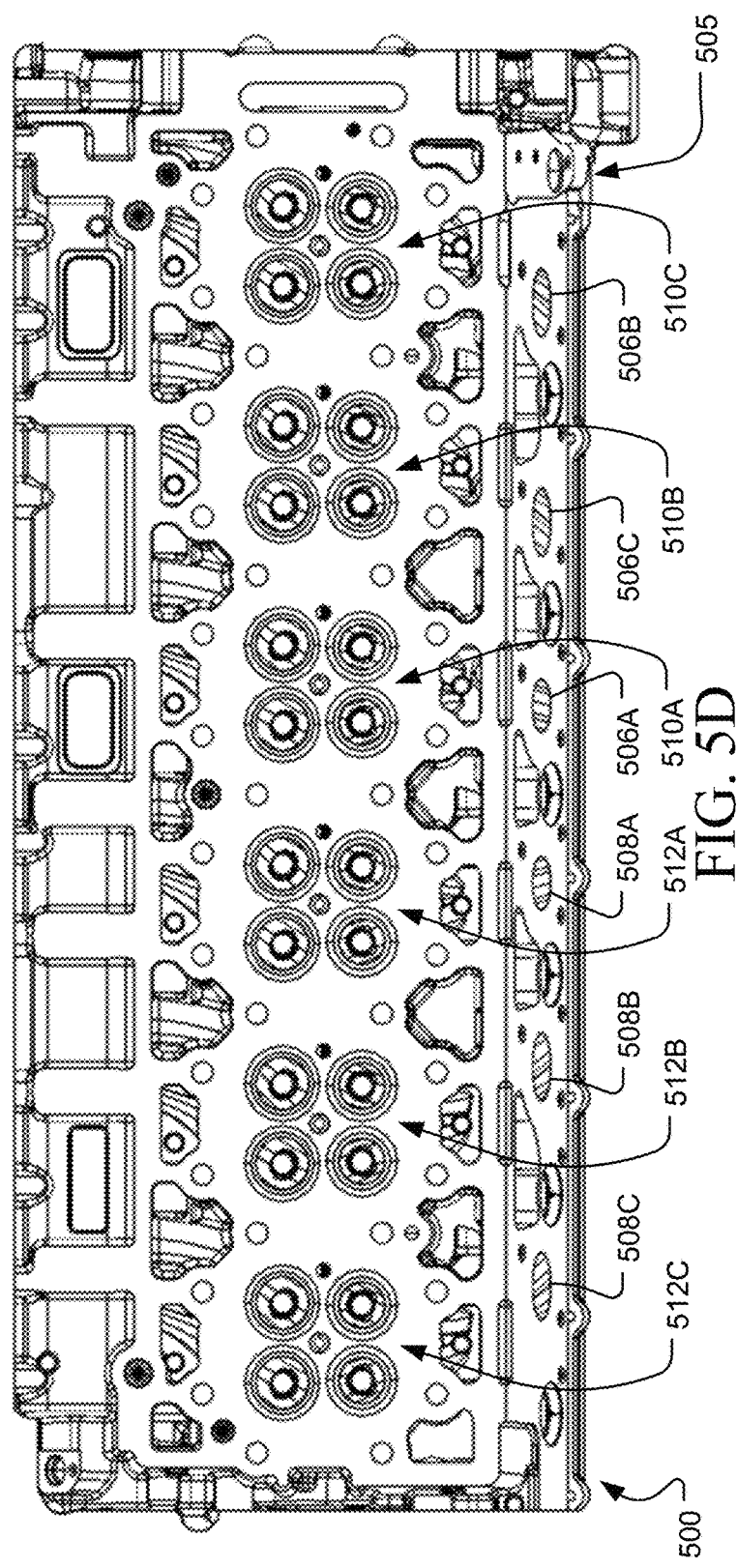
FIG. 5D depicts a bottom-up view of the cylinder head of FIG. 5A.
Figure 5E:
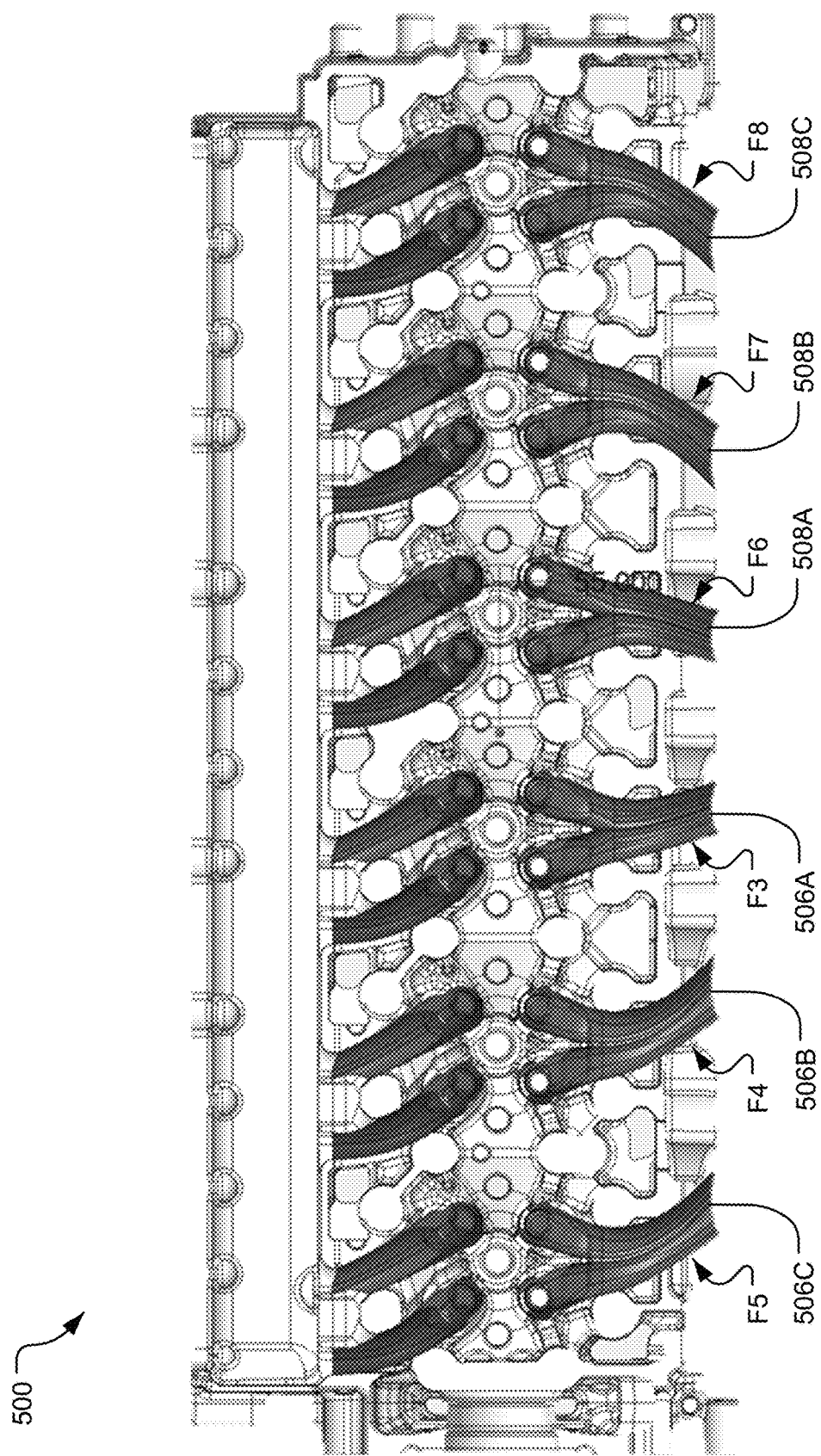
FIG. 5E depicts exhaust flow paths through the cylinder head of FIG. 5A as shown in a top-down view.

FIGS. 5A-5E depict different views of a cylinder head 500. FIG. 5A depicts a top perspective view of the cylinder head 500, FIG. 5B depicts a bottom perspective view of the cylinder head 500, FIG. 5C depicts a side view of the cylinder head 500, including cylinder head outlets, FIG. 5D depicts a bottom-up view of the cylinder head 500, and FIG. 5E depicts exhaust flow paths through the cylinder head 500 as shown in a top-down view. As shown, the cylinder head 500 includes a top end 502, a bottom end 504, a side 505, cylinder head outlets 506A-C, 508A-C, exhaust ports 510A-C, 512A-C, coupling holes 514, and exhaust flow paths F3-F8.

As shown, the cylinder head 500 includes exhaust flow paths F3-F8 coupling the exhaust ports 510A-C, 512A-C at the bottom end 504 of the cylinder head 500 with the cylinder head outlets 506A-C, 508A-C at the side 505 of the cylinder head 500. The surface associated with the side 505 of the cylinder head 500 may otherwise be referred to herein as a coupling surface of the cylinder head 500 to couple to an exhaust manifold. Similar to the geometry considerations described above with respect to the exhaust manifold 400, the exhaust flow paths F3-F8 may have geometries for energy conservation. Each branch of the exhaust flow paths F3-F8 through the cylinder head 500 may have a constant diameter. The diameter of each branch in the cylinder head 500 may be the same as the diameter of each corresponding branch of the exhaust flow paths F1, F2 in the exhaust manifold. Additionally, the exhaust ports 510A-C, 512A-C and cylinder head outlets 506A-C, 508A-C of the cylinder head 500 may have an elliptical shape. In some instances, the elliptical shape may be circular. Coupling of the cylinder head 500 with cylinders via exhaust ports and/or coupling of the cylinder head 500 with an exhaust manifold may be facilitated via coupling holes 514 (some, but not all, labelled). Other geometrical features of the exhaust flow paths through the cylinder head 500 are described at least with respect to FIGS. 6A-6C, 7A-7B.

Each exhaust flow path F3-F8 in the cylinder head 500 is independent. Each of the exhaust flow paths F3-F8 are fluidly couplable to a pair of exhaust ports 510A-C, 512A-C (which, when referring to a flow path of exhaust through the cylinder head may be referred to as exhaust inlets). For example, a first exhaust flow path F3 through the cylinder head 500 combines branches stemming from two exhaust ports 510A (e.g., a pair of inlets associated with a pair of exhaust ports) on the bottom end 504 of the cylinder head 500 and ends at a cylinder head outlet 506A on the side 505 of the cylinder head 500. Each of the exhaust flow paths F3-F8 curves between the bottom end 504 of the cylinder head 500 to the side 505 of the cylinder head 500. The curvature along each exhaust flow path F3-F8 is also designed for energy conservation. Curvature along each exhaust flow path F3-F8 may have a variable radius of curvature, each of which may have a minimum radius. For example, the curvature along any single exhaust flow path F3-F8 may begin with a minimum radius (e.g., the sharpest portion of the curvature) and taper to a larger radius (e.g., a smoother portion of the curvature). As shown, curves along each exhaust flow path F3-F8 are elongated, smooth bends. For example, maximum curvature in any direction along any outer wall defining a section of an exhaust flow path F3-F8 may be less than 90 degrees, less than 80 degrees, less than 75 degrees, or have a radius of at least 80 mm, 85 mm, 90 mm, or more. Similar to the exhaust flow paths described above for the exhaust manifold, curvatures of branches of the exhaust flow paths F3, F6 that are closer to the center of the cylinder head 500 may have less curvature than branches of the exhaust flow paths F5, F8 that are further from the center of the cylinder head 500. Because the exhaust flow paths F3-F8 connect the bottom end 504 of the cylinder head 500 with the side 505 of the cylinder head 500, each exhaust flow path F3-F8 includes curvature in at least a first direction (e.g., from vertical to horizontal). Additionally, each of the exhaust flow paths F3-F8 includes curvature towards the center of the cylinder head 500. Thus, each of the exhaust flow paths F3-F8 includes curvature in at least two directions (e.g., the full length of the flow paths F3-F8 cannot be intersected by a single plane).

As described herein, the side 505 of the cylinder head 500 may couple to exhaust manifold (e.g., exhaust manifold 400). The seal between the side 505 of the cylinder head 500 and the exhaust manifold may be an airtight seal (e.g., by using a gasket between them). The coupling of the side 505 of the cylinder head 500 with the exhaust manifold fluidly couples the exhaust flow paths F3-F8 of the cylinder head 500 with the exhaust flow paths in the exhaust manifold (e.g., exhaust flow paths F1, F2). Thus, the coupling of the cylinder head 500 with an exhaust manifold forms a new, combined exhaust flow path with exhaust ports 510A-C, 512A-C on the bottom end 504 of the cylinder head 500 and at least two exhaust manifold outlets on an outlet surface of an exhaust manifold (e.g., exhaust manifold outlets 410, 412) to form at least two, independent exhaust flow paths to turbocharger(s).

Figure 6A:
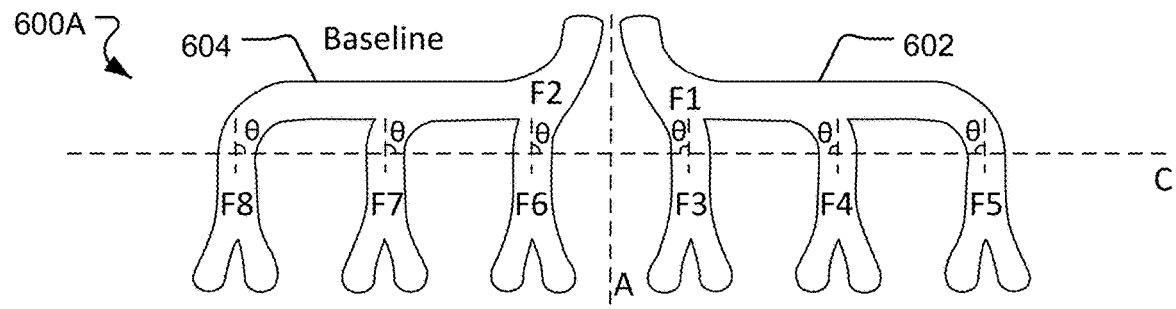
FIGS. 6A-6C depict different top-down views of example exhaust flow paths through a cylinder head and an exhaust manifold.
Figure 6B:
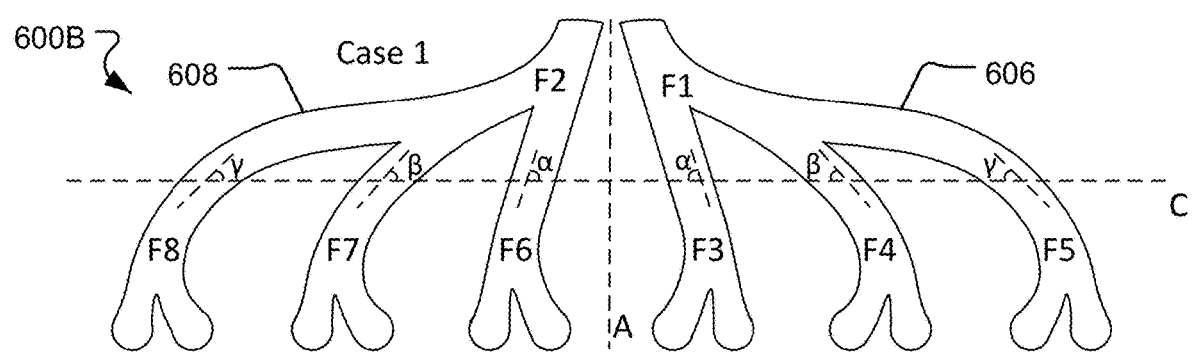
Figure 6C:
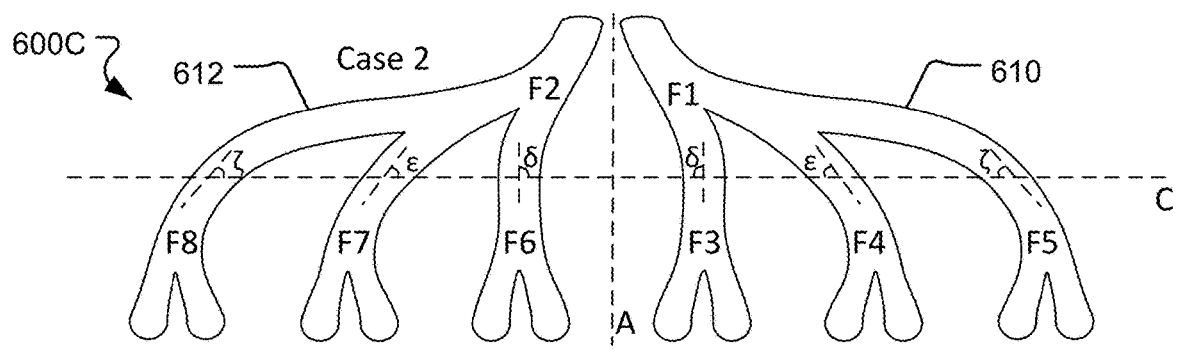

FIGS. 6A-6C depict different top-down views of example exhaust flow paths 600A, 600B, 600C through a cylinder head (e.g., cylinder head 500) and an exhaust manifold (e.g., exhaust manifold 400). The cylinder head portions F3-F8 of the exhaust flow paths 600A, 600B, 600C that are contained in the cylinder head are shown below a coupling plane C, at which the cylinder head (e.g., at a coupling surface having cylinder head outlets 724) couples to the exhaust manifold (e.g., at a coupling surface having exhaust manifold inlets). Additionally, manifold portions F1, F2 of the exhaust flow paths 600A, 600B, 600C that are contained in the exhaust manifold are shown above the coupling plane C. Each of the exhaust flow paths 600A, 600B, 600C are symmetric about a symmetry plane S. As further described herein, each of the exhaust flow paths 600A, 600B, 600C includes at least two, independent paths for the flow of exhaust gases through the cylinder head and exhaust manifold.

The exhaust flow paths 600A, 600B, 600C shown in FIGS. 6A-6C have different geometries. Although specific examples of flow paths through an exhaust manifold and a cylinder head are shown herein (e.g., in FIGS. 3A-3B, 4A-4J, 5A-5E, and 7A-7B) at least the other geometries contemplated in these exhaust flow paths 600A, 600B, 600C are appreciated. For example, the exhaust manifolds shown in FIGS. 3A-3B and 4A-4J have the geometry of the manifold portions F1, F2 of the case 1 exhaust flow path 600B shown in FIG. 6B. As another example, the cylinder head shown in FIGS. 5A-5E has the geometry of the cylinder head portions F3-F8 of the case 1 exhaust flow path 600B shown in FIG. 6B. Alternatively, the exhaust flow paths 700 shown in FIGS. 7A-7B have the geometries of the baseline exhaust flow path 600A shown in FIG. 6A.

Figure 7A:
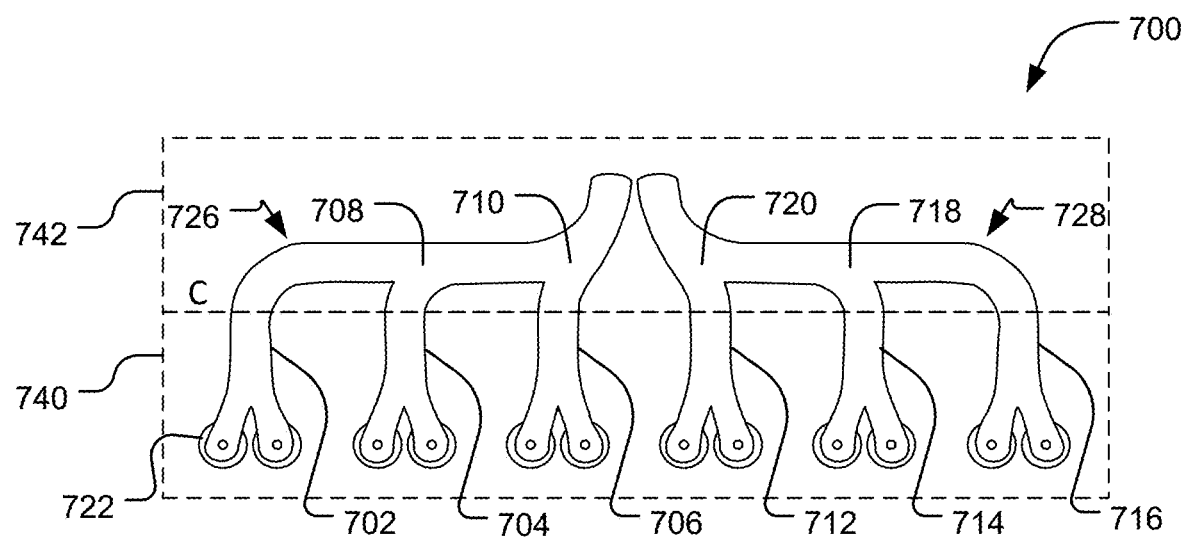
FIG. 7A depicts a top-down view of example exhaust flow paths.
Figure 7B:
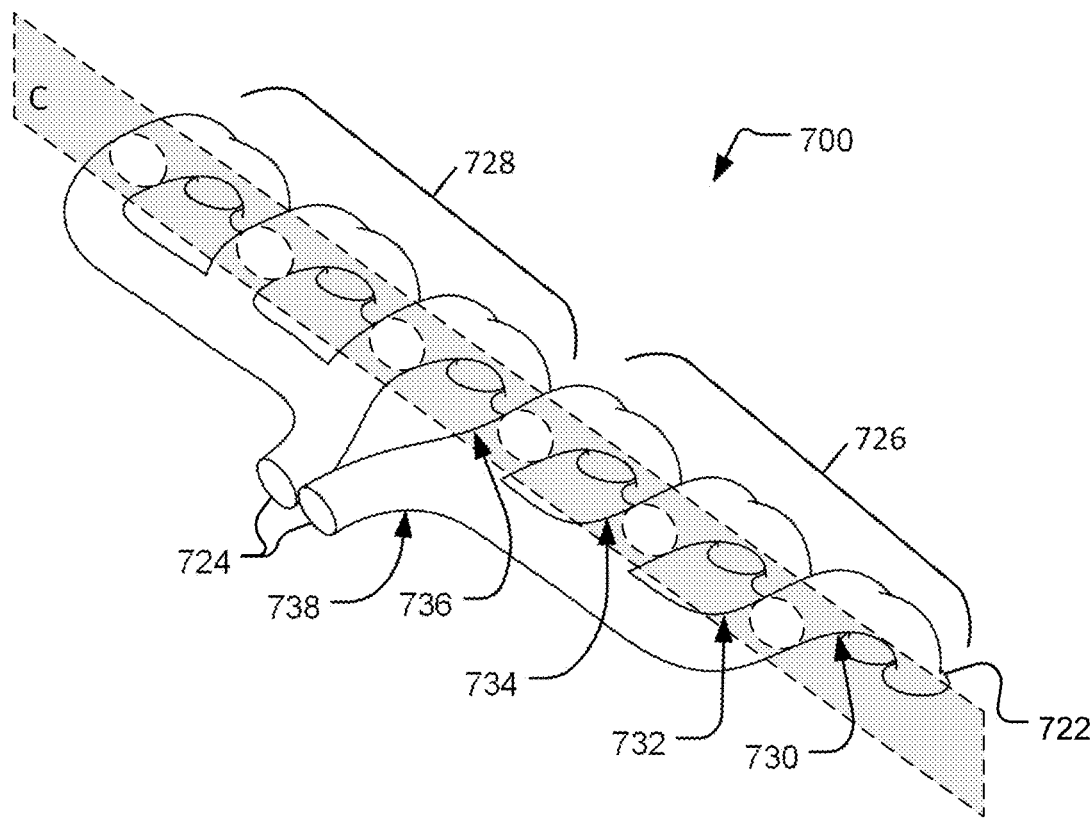
FIG. 7B depicts a perspective view of the example exhaust flow paths of FIG. 7A.
Figure 8A:
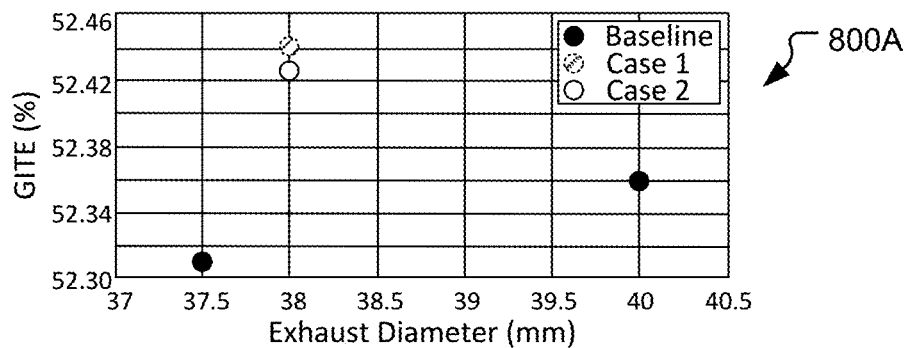
FIGS. 8A-8D depicts graphical information of thermal efficiency, friction, and pumping of an exhaust manifold of the different flow paths described in at least FIGS. 6A-6C.
Figure 8B:
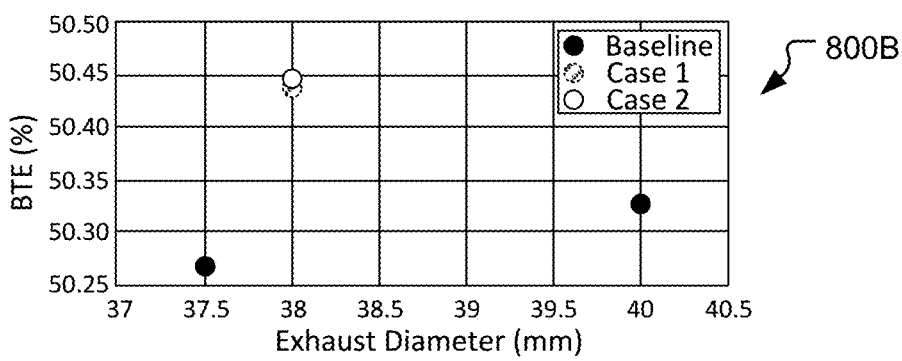
Figure 8C:
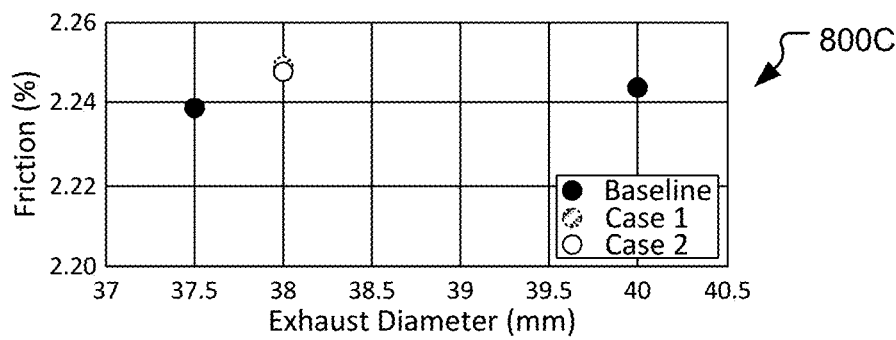
Figure 8D:
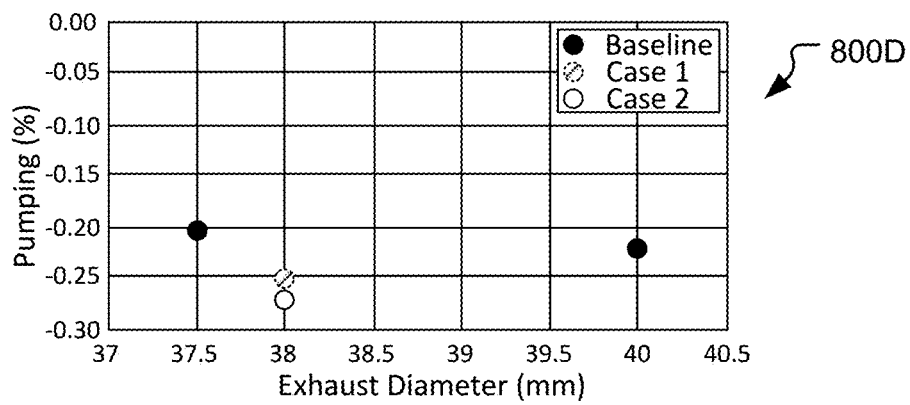

The baseline exhaust flow path 600A in FIG. 6A includes limited curvature of the cylinder head portions F3-F8 of the exhaust flow path 600A along the plane shown. For example, the cylinder head portions F3-F8 may curve towards exhaust ports (into the page, as depicted), which is shown in FIGS. 7A-7B. In the baseline base example, each of the cylinder head portions F3-F8 extends substantially parallel to the symmetry plane S. In the baseline exhaust flow path 600A, the flow path includes a junction angle θ that is substantially perpendicular to the coupling plane C at each intersection of the baseline flow path 600A with the coupling plane C (e.g., the baseline exhaust flow path 600A includes junction angles θ that are substantially perpendicular to the surfaces coupled between the cylinder head and the exhaust manifold). Instead of curving the exhaust flow path 600A in the cylinder head portions F3-F8 in the plane shown, the baseline exhaust flow path 600A curves in the manifold portions F1, F2.

The manifold portions F1, F2 of the baseline exhaust flow path 600A include elongated segments 602, 604 extending outward from the symmetry plane S, along which branches of the baseline exhaust flow path 600A are combined. In the baseline exhaust flow path 600A, the elongated segments 602, 604 are substantially parallel to the coupling plane C. Three branches of each of the manifold flow paths F1, F2 of the baseline exhaust flow path 600A branch off of the elongated segments 602, 604 and curve to align with the cylinder head portions F3-F8 at the coupling plane C.

The case 1 exhaust flow path 600B in FIG. 6B distributes curvature along the exhaust flow path 600A between the cylinder head portions F3-F8 and the manifold portions F1, F2, along the plane shown. In the case 1 exhaust flow path 600B, each of the cylinder head portions F3-F8 intersect the coupling plane C at junction angles α, β, γ less than 90 degrees (e.g., the case 1 exhaust flow path 600B includes junction angles α, β, γ that are less than 90 degrees to the surfaces coupled between the cylinder head and the exhaust manifold). The junction angles α of the central branches (e.g., the branches that include cylinder head portions F3, F6) are greater than the junction angles β of the middle branches (e.g., the branches that include cylinder head portions F4, F7). Additionally, the junction angles β of the middle branches are greater than the junction angles γ of the outer branches (e.g., the branches that include cylinder head portions F5, F8). In examples, the junction angles α of the central branches may be less than 90 degrees, less than 60 degrees, less than 50 degrees, or less.

The manifold portions F1, F2 of the case 1 exhaust flow path 600B includes elongated segments 606, 608 extending outward from the symmetry plane S, along which the branches of the case 1 exhaust flow path 600B combine. In the case 1 exhaust flow path 600B, the elongated segments 606, 608 angle toward the coupling surface plane C away from the symmetry plane S (e.g., the elongated segments 606, 608 are closer to the coupling surface plane C further away from the symmetry plane S). Three branches of each of the manifold flow paths F1, F2 of the case 1 exhaust flow path 600B branch off of the elongated segments 606, 608 and continue curving through the cylinder head portions F3-F8 below the coupling surface plane C. The central branches of the case 1 exhaust flow path 600B may be substantially straight (e.g., substantially free of curvature).

The case 2 exhaust flow path 600C in FIG. 6C is similar to the case 1 exhaust flow path 600B, except for curvature of the central branches. For instance, in the case 2 exhaust flow path 600C, the curvature is distributed between the cylinder head portions F3-F8 and the manifold portions F1, F2, along the plane shown. In the case 2 exhaust flow path 600C, each of the cylinder head portions F3-F8 intersect the coupling surface plane C at junction angles δ, ε, ζ less than 90 degrees (e.g., the case 2 exhaust flow path 600C includes junction angles δ, ε, ζ that are less than 90 degrees to the surfaces coupled between the cylinder head and the exhaust manifold). The junction angles δ of the central branches (e.g., the branches that include cylinder head portions F3, F6) are greater than the junction angles ε of the middle branches (e.g., the branches that include cylinder head portions F4, F7). Additionally, the junction angles ε of the middle branches are greater than the junction angles ζ of the outer branches (e.g., the branches that include cylinder head portions F5, F8). In examples, the junction angles δ of the central branches may be 90 degrees or less.

The manifold portions F1, F2 of the case 2 exhaust flow path 600C includes elongated segments 610, 612 extending outward from the symmetry plane S, along which the branches of the case 2 exhaust flow path 600C are combined. In the case 2 exhaust flow path 600C, the elongated segments 610, 612 angle toward the coupling surface plane C (e.g., the elongated segments 610, 612 are closer to the coupling surface plane C further away from the symmetry plane S). Three branches of each of the manifold flow paths F1, F2 of the case 2 exhaust flow path 600C branch off of the elongated segments 610, 612 and curve through the cylinder head portions F3-F8 after the coupling surface plane C. Unlike the central branches of the case 1 exhaust flow path 600B, the central branches of the case 2 exhaust flow path 600C may intersect the coupling surface plane C at a substantially perpendicular angle (e.g., no curvature of the central cylinder head portions F3, F6), curving above the coupling surface plane C (e.g., having curvature of the central branch in the manifold portion F1, F2).

FIG. 7A depicts a top-down view of an example an exhaust flow path 700 and FIG. 7B depicts a perspective view of the example exhaust flow path 700 of FIG. 7A. As described herein, the exhaust flow path 700 is formed through at least two components of an engine, such as a cylinder head and an exhaust manifold. Thus, the exhaust flow path 700 may include a cylinder head portion 740 and an exhaust manifold portion 742, separated by coupling surface plane C at which the cylinder head couples to the exhaust manifold. The cylinder head portion 740 of the exhaust flow path 700 includes cylinder head inlets 722 (e.g., exhaust inlets to a flow path 700, otherwise referred to herein as exhaust ports 722) to receive flow of exhaust gases from exhaust ports 722 (e.g., twelve exhaust ports 722 shown).

As described herein, a first flow path 726 and a second flow path 728 are internal cavities of an exhaust manifold (e.g., in the exhaust manifold portion 742) and of a cylinder head (e.g., in the cylinder head portion 740). In the exhaust manifold portion 742, the exhaust flow path 700 includes a first flow path 726 and a second flow path 728. The first flow path 726 and the second flow path 728 may be symmetric. Each of the first flow path 726 and the second flow path 728 include an elongated portion each having at least two branch junctions 708, 710, 718, 720 off of which branches 702, 704, 706, 712, 714, 716 extend.

In the example shown in FIGS. 7A-7B, the first flow path 726 exists along a plane through the exhaust manifold portion 742. The first flow path 726 includes an elongated portion and portions of three branches 702, 704, 706. The elongated portion may be a substantially straight portion. One end of the elongated portion couples with an outlet curvature 738 between the elongated portion and an exhaust outlet 724 (exhaust outlets from the flow path 700 that includes a portion through a cylinder head and a portion through an exhaust manifold, otherwise referred to herein as an exhaust manifold outlet 724) of the first flow path 726. As described herein with respect to exhaust flow paths through the cylinder head (e.g., exhaust flow paths F3-F8 in FIGS. 5A-5E) and flow paths through the exhaust manifold (e.g., flow paths F1, F2 in FIGS. 4A-4J), each branch of the first flow path 726 may have a variable curvature with at least a minimum radius. An outer branch 702 curves off of a second end of the elongated portion of the first flow path 726 with an outer curvature 732 having at least an outer minimum radius. A middle branch 704 merges with the elongated portion (and the outer branch) at a first branch junction 708 with a middle curvature 734. The central branch 706 merges with the elongated portion (and the outer branch and middle branch) at a second branch junction 710 with a central curvature 736. The outer branch 702 curves more than the middle branch 704 which curves more than the central branch 706. Stated differently, the outer curvature 732 is greater than (e.g., has a smaller minimum radius than) the middle curvature 734, which is greater than (e.g., has a smaller minimum radius than) the central curvature 736. In an example, the central curvature 736 may have an infinite radius (e.g., the central branch 706 may be straight).

The first flow path 726 through the cylinder head portion 740 includes portions of the three branches 702, 704, 706 extending from the exhaust manifold portion 742. The outer branch 702 couples with a first pair of exhaust ports 722, the middle branch 704 couples with a second pair of exhaust ports 722, and the central branch 706 couples with a third pair of exhaust ports 722. Each of the branch portions in the cylinder head portion 740 have a downward curvature 730 through the cylinder head as further described at least with respect to FIGS. 5A-5E to curve the first flow path 726 off of the plane of the exhaust manifold portion 742. The first flow path 726 facilitates flow of exhaust gases from the first, second, and third pairs of exhaust ports 722 through the branches 702, 704, 706, through the elongated portion, and out of the outlet 724.

Similar to the first flow path 726, the second flow path 728 through the exhaust manifold portion 742 includes an elongated portion and portions of three branches 712, 714, 716. The second flow path 728 is different from, separate from, and/or independent from the first flow path 726. The second flow path 728 may be symmetric to the first flow path 726. Thus, in examples, the second flow path 728 may be both independent from and symmetric to the first flow path 726. The elongated portion may be a substantially straight portion. One end of the elongated portion couples with an outlet curvature between the elongated portion and an outlet 724 of the second flow path 728. Each branch of the first flow path 726 may have a variable curvature with at least a minimum radius. An outer branch 716 curves off of a second end of the elongated portion of the second flow path 728 with an outer curvature having an outer minimum radius. A middle branch 714 merges with the elongated portion (and the outer branch) at a first branch junction 718 with a middle curvature. The central branch 712 merges with the elongated portion (and the outer branch and middle branch) at a second branch junction 720 with a central curvature. The outer branch 716 curves more than the middle branch 714 which curves more than the central branch 712. Stated differently, the outer curvature is greater than (e.g., has a smaller minimum radius than) the middle curvature, which is greater than (e.g., has a smaller minimum radius than) the central curvature. In an example, the central curvature may have an infinite radius (e.g., the central branch 712 may be straight).

The following is a specific example of minimum curvatures of the first flow path 726. Curvature with respect to the cylinder head portion 740 may be as follows. An outer minimum radius of the outer curvature of the outer branch 716 in the cylinder head portion 740 is at least 90 mm. A middle minimum radius of the middle curvature of the middle branch 714 in the cylinder head portion 740 is at least 90 mm. A central minimum radius of the central curvature of the central branch 712 in the cylinder head portion 740 is at least 175 mm. Curvature with respect to the exhaust manifold portion 742 may be as follows. An outer minimum radius of the outer curvature of the outer branch 716 in the exhaust manifold portion 742 is at least 219 mm. A middle minimum radius of the middle curvature of the middle branch 714 in the exhaust manifold portion 742 is at least 219-475 mm. A central minimum radius of the central curvature of the central branch 712 in the exhaust manifold portion 742 is at least 475 mm. An outlet minimum radius between the second branch junction 720 and the outlet 724 is at least 100 mm.

The second flow path 728 through the cylinder head portion 740 includes portions of the three branches 712, 714, 716 extending from the exhaust manifold portion 742. The outer branch 716 couples with a fourth pair of exhaust ports 722, the middle branch 714 couples with a fifth pair of exhaust ports 722, and the central branch 712 couples with a sixth pair of exhaust ports 722. Each of the branch portions in the cylinder head portion 740 have a downward curvature through the cylinder head as further described at least with respect to FIGS. 5A-5E to curve the first flow path 728 off of the plane of the exhaust manifold portion 742. The second flow path 728 facilitates flow of exhaust gases from the fourth, fifth, and sixth pairs of exhaust ports 722 through the branches 712, 714, 716, through the elongated portion, and out of an outlet 724.

Each branch 702, 704, 706, 712, 714, 716, the elongated portion, the exhaust inlets 722 (e.g., exhaust ports 722), and the exhaust outlets 724 (e.g., exhaust manifold outlets 724) of the exhaust flow path 700 may have a same, constant diameter. In an example, the diameter of these components of the exhaust flow path 700 is between 37 mm and 41 mm, such as 38.1 mm. The branch junctions 708, 710, 718, 720 along the exhaust flow path 700 may have a diameter different from each branch 702, 704, 706, 712, 714, 716. The inlets 722 and outlets 724 may be elliptical (e.g., circular or non-circular) and any cross-section along a branch 702, 704, 706, 712, 714, 716 or elongated portion of the exhaust flow path 700 may have a matching elliptical shape (e.g., circular or non-circular). Although independent flow paths are shown within the exhaust flow path 700, one or more portions of the exhaust flow path 700 may be formed within a single engine component. For example, the exhaust manifold portion 742 may be formed inside a single exhaust manifold and the cylinder head portion 740 may be formed inside of a single cylinder head.

FIGS. 8A-8D depict graphical information 800A-D of thermal efficiency, friction, and pumping of an exhaust manifold of the different flow paths described in at least FIGS. 6A-6C. As shown, the baseline case geometry (e.g., the flow path shape described with respect to FIGS. 6A, 7A, 7B) has the smallest absolute values for gross indicated thermal efficiency (GITE), brake thermal efficiency (BTE), friction, and pumping. The case 1 geometry (e.g., the flow path shape described with respect to FIGS. 6B) has the largest absolute values for GITE and friction. The case 2 geometry (e.g., the flow path shape described with respect to FIG. 6C) has the largest absolute values for BTE and pumping. As indicated by the graphical information graphical information 800A-D, despite differences in diameters of the baseline case from case 1 and case 2, the geometries of case 1 and case 2 may have better kinetic and thermal energy conservation than the baseline case.

Figure 9:
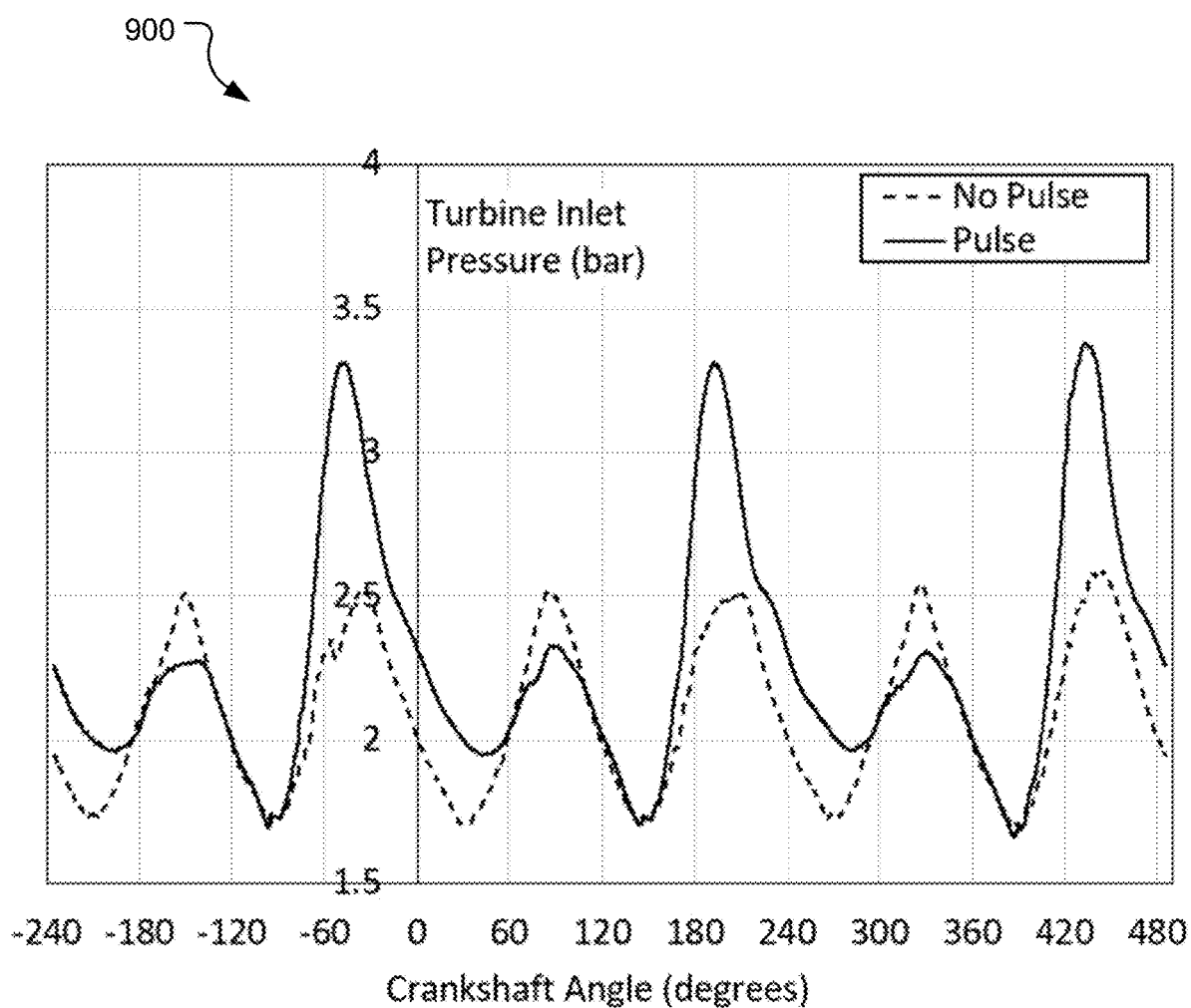
FIG. 9 depicts graphical information of turbine inlet pressure versus crankshaft angle for no exhaust separation with no pulse and exhaust separation with pulse.

FIG. 9 depicts graphical information 900 of turbine inlet pressure versus crankshaft angle for no exhaust separation with no pulse and exhaust separation with pulse. As shown, greater overall turbine inlet pressures are achieved with exhaust separation (e.g., two exhaust flow paths as shown and described herein) with pulse. Separating exhaust flows from some exhaust ports may reduce conflicts in air flow from cylinders firing at different crankshaft angles, thereby increasing turbine inlet pressure (e.g., at an outlet of the exhaust flow path).

Figure 10A:
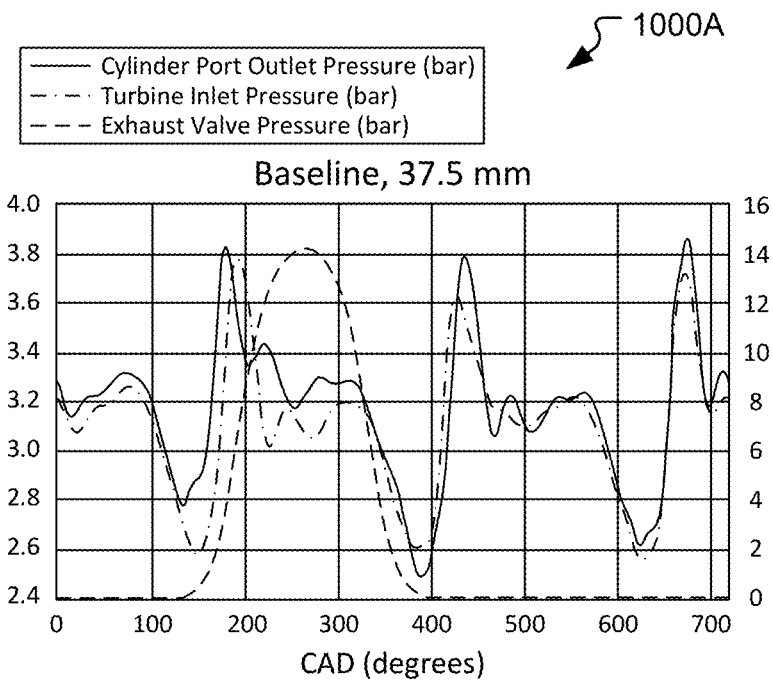
FIGS. 10A-10B depict graphical information of pressure through an exhaust manifold of different internal diameters and configurations.
Figure 10B:
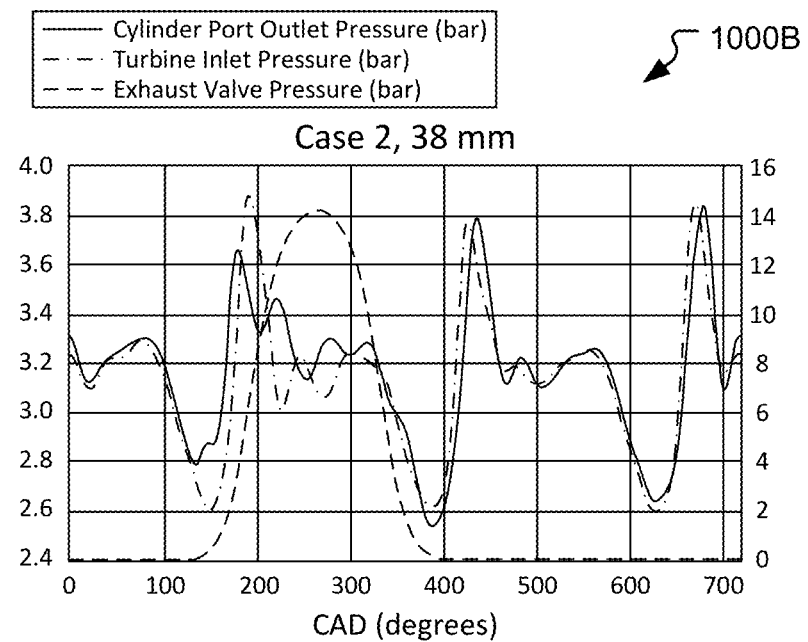
Figure 11A:
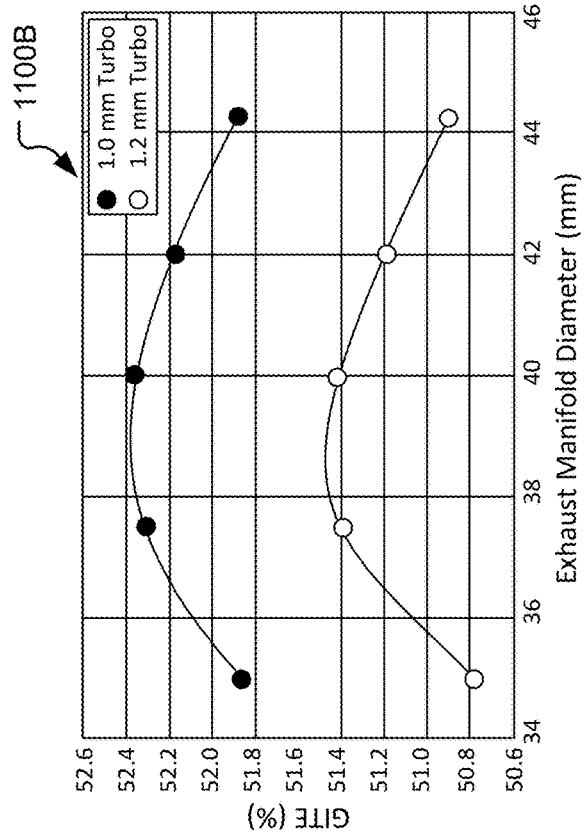
FIGS. 11A-11D depict graphical information of thermal efficiency and pulse factors of an exhaust manifold of different internal diameters.
Figure 11B:
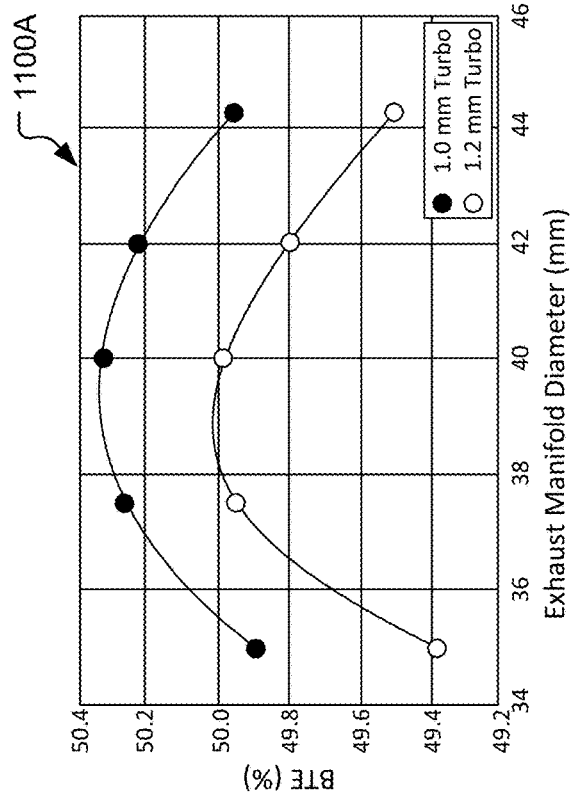
Figure 11C:
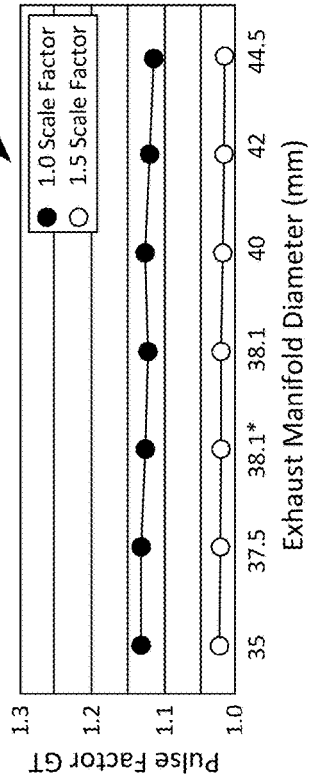
Figure 11D:
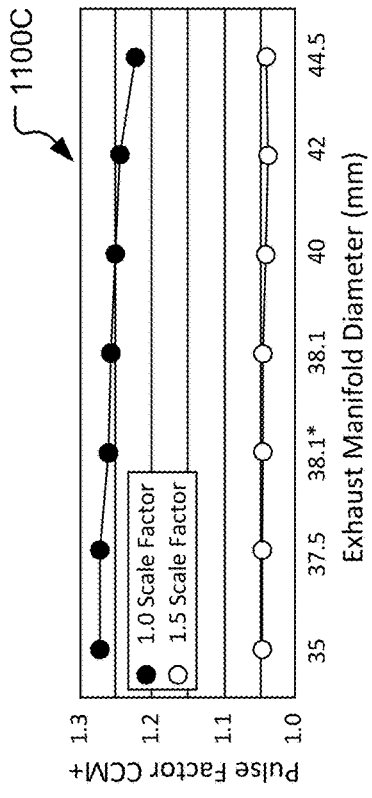

FIGS. 10A-10B depict graphical information 1000A-B of pressure through an exhaust manifold of different internal diameters and configurations. The graphical information 1000A-B shows cylinder port outlet pressure, turbine inlet pressure, and exhaust pressure versus crankshaft angle. The first graph 1000A shows the variables for the baseline case geometry with a flow path branch diameter of 37.5 mm. The second graph 1000B shows the variables for the case 2 geometry with a flow path diameter of 38 mm. As shown, with a change in geometry and diameter, the second graph 1000B includes increased turbine inlet pressure (e.g., at an outlet of the exhaust flow path) with a reduction in at least one peak of the cylinder port outlet pressure. Thus, the geometry of case 2 may have better kinetic and thermal energy conservation than the baseline case.

FIGS. 11A-11D depict graphical information 1100A-D of thermal efficiency and pulse factors of an exhaust manifold of different internal diameters. As shown in the graphical information 1000A-B showing thermal efficiency, BTE and GITE are maximized around 38 mm, such as 38.1 mm, regardless of whether a 1.0 mm or 1.2 mm turbocharger is used. The graphical information 1000C-D showing pulse factor decreases with an increase in internal diameter. The 38.1* diameter indicates data for case 1 geometry and the 38.1 diameter indicates data for case 2 geometry. As shown, the case 1 geometry has a higher pulse factor than the case 2 geometry for both CCM and GT systems.

Figure 12:
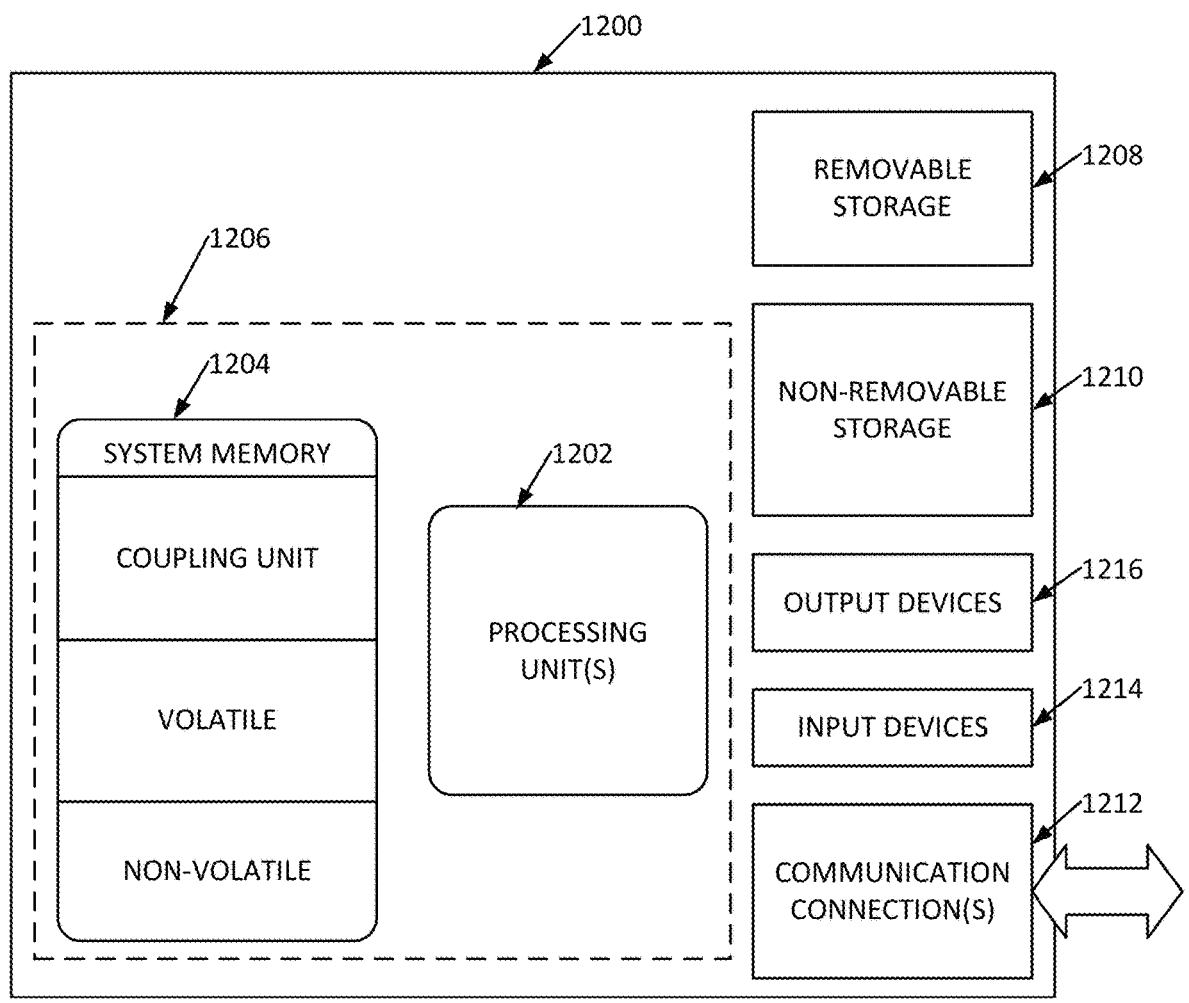
FIG. 12 depicts an example of a control operating environment.

FIG. 12 illustrates an example of a suitable operating environment 1200 in which one or more of the present embodiments may be implemented. In examples, operating environment 1200 may be used to control operation of the crankshaft or other components of the engine in FIGS. 3A-3B. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1200 typically may include at least one processing unit 1202 and memory 1204. Depending on the exact configuration and type of computing device, memory 1204 (storing, among other things, APIs, programs, etc. and/or other components or instructions to implement or perform the system and methods disclosed herein, etc.) may be volatile (such as RAM), nonvolatile (such as ROM, flash memory, etc.), or some combination of the two. This most basic configuration is illustrated in FIG. 12 by dashed line 1206. Further, operating environment 1200 may also include storage devices (removable, 1208, and/or nonremovable, 1210) including, but not limited to, magnetic or optical disks or tape. Similarly, environment 1200 may also have input device(s) 1214 such as a keyboard, mouse, pen, voice input, etc. and/or output device(s) 1216 such as a display, speakers, printer, etc. Also included in the environment may be one or more communication connections, 1212, such as LAN, WAN, point to point, etc.

Operating environment 1200 may include at least some form of computer readable media. The computer readable media may be any available media that can be accessed by processing unit 1202 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct wired connection, and wireless media such as acoustic, RF, infrared and other wireless media. Combinations of the any of the above should also be included within the scope of computer readable media.

The operating environment 1200 may be one or more computers operating in a networked environment using logical connections to one or more remote computers. The remote computer may be a personal computer, a server, a router, a network PC, a peer device or other common network node, and typically includes many or all of the elements described above as well as others not so mentioned. In an example, the operating environment may include one or more vehicle controllers and/or processors associated with the vehicle or truck. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 1204. While executing on the processing unit 1202, program modules (e.g., applications, Input/Output (I/O) management, and other utilities) may perform processes including, but not limited to, one or more of the stages of the operational methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 1200 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A combustion engine comprising:
a cylinder head including:
at least four exhaust ports to receive exhaust gases produced by cylinders of the combustion engine;
at least four cylinder head outlets; and
at least four cylinder head flow paths defined within the cylinder head and fluidly coupling each of the exhaust ports with at least one of the cylinder head outlets;
an exhaust manifold including:
a first end having exhaust manifold inlets, wherein the first end is couplable to the side of the cylinder head to fluidly couple the exhaust manifold inlets with the cylinder head outlets;
a second end having a first exhaust manifold outlet and a second exhaust manifold outlet;
a first exhaust manifold flow path internal to the exhaust manifold that fluidly couples at least two cylinder head flow paths of the at least four cylinder head flow paths with a first set of three exhaust manifold inlets and the first exhaust manifold outlet via at least three branches, wherein the first exhaust manifold flow path is bisectable by a plane, wherein the at least three branches include a central branch having a straight portion, an outer branch having an outer curvature, and a middle branch between the central branch and the outer branch having a maximum curvature that is less than the outer curvature of the outer branch; and
a second exhaust manifold flow path internal to the exhaust manifold, separate from the first exhaust manifold flow path, that fluidly couples at least two cylinder head flow paths of the at least four cylinder head flow paths to the second exhaust manifold outlet.

2. The combustion engine of claim 1, wherein the exhaust manifold further includes a second set of three exhaust manifold inlets, and wherein the second set of three exhaust manifold inlets is fluidly coupled to the second exhaust manifold outlet via the second exhaust manifold flow path.

3. The combustion engine of claim 2, wherein the exhaust manifold is symmetric about a symmetry plane between the first exhaust manifold flow path and the second exhaust manifold flow path.

4. The combustion engine of claim 3, wherein the central branch is closest to the symmetry plane and the outer branch is furthest from the symmetry plane.

5. The combustion engine of claim 4, wherein the outer curvature has a minimum radius of 90 mm.

6. The combustion engine of claim 4, wherein the central branch intersects the first end of the exhaust manifold at a first angle, the middle branch intersects the first end of the exhaust manifold at a second angle, and the outer branch intersects the first end of the exhaust manifold at a third angle, wherein the first angle is greater than the second angle, and the second angle is greater than the third angle.

7. The combustion engine of claim 6, wherein the at least four cylinder head flow paths internal to the cylinder head include six cylinder head flow paths, and wherein the six cylinder head flow paths are curved based on the first angle of the central branch of the exhaust manifold, the second angle of the middle branch of the exhaust manifold, and the third angle of the outer branch of the exhaust manifold.

8. The combustion engine of claim 4, wherein the central branch, the outer branch, the middle branch, and at least a portion of the at least four cylinder head flow paths have an equal diameter.

9. The combustion engine of claim 1, wherein the first exhaust manifold outlet, at least one of the exhaust ports, and the second exhaust manifold outlet are elliptical.

10. The combustion engine of claim 9, wherein the at least one exhaust port, the first exhaust manifold outlet, and the second exhaust manifold outlet are circular.

11. An exhaust system defining an exhaust flow path for an engine, the exhaust flow path comprising:
- a set of exhaust inlets fluidly couplable to at least two exhaust ports of the engine, the set of exhaust inlets including a first exhaust inlet and a second exhaust inlet;
- a first exhaust manifold outlet fluidly couplable to a first turbocharger of the engine;
- a second exhaust manifold outlet fluidly couplable to a second turbocharger of the engine;
- a first flow path coupling the first exhaust inlet to the first exhaust outlet; and
- a second flow path coupling the second exhaust inlet to the second exhaust outlet, wherein the second flow path is independent from and symmetric to the first flow path, and wherein a radius of any curvature along the second flow path is at least 90 mm.

12. The exhaust system of claim 11, wherein the set of exhaust inlets includes at least six exhaust inlets, and wherein the first flow path and the second flow path each has an outer branch, a middle branch, and a central branch extending along a plane.

13. The exhaust flow path of claim 12, wherein the central branch curves at a central minimum radius of at least 150 mm.

14. The exhaust flow path of claim 13, wherein a middle minimum radius of the middle branch has a radius less than the central minimum radius.

15. The exhaust flow path of claim 12, wherein the central branch includes a straight portion.

16. The exhaust flow path of claim 11, wherein the first flow path and the second flow path are symmetric about a symmetry plane, wherein the first flow path and the second flow path each includes a cylinder head portion and an exhaust manifold portion, wherein the cylinder head portion and the exhaust manifold portion are coupled at a coupling surface plane substantially perpendicular to the symmetry plane.

17. The exhaust flow path of claim 16, wherein an outer branch of each of the first flow path and the second flow path intersects the attachment line at an angle smaller than a middle branch or a central branch.

18. An exhaust manifold having an exhaust flow path, the exhaust manifold comprising:
- a first end including a first set of three inlets and a second set of three inlets;
- a second end including a first outlet and a second outlet;
- an exterior wall having a minimum radius of 200 mm;
- a first flow path internal to the exterior wall of the exhaust manifold, the first flow path fluidly coupling the first set of three inlets to the first outlet, and wherein the first flow path includes an outer branch, a middle branch, and a central branch; and
- a second flow path internal to the exterior wall of the exhaust manifold, the second flow path fluidly coupling the second set of three inlets to the second outlet, and wherein the second flow path is separate from and symmetrical to the first flow path.

19. The exhaust manifold of claim 18, wherein an outer radius associated with the outer branch has the minimum radius and wherein a middle minimum radius associated with the middle branch and a central minimum radius associated with the central branch are each greater than the minimum radius.

20. The exhaust manifold of claim 18, wherein at least a portion of the exterior wall associated with the central branch is straight.

* * * * *